US008935254B2

(12) United States Patent
Hartman

(10) Patent No.: US 8,935,254 B2
(45) Date of Patent: Jan. 13, 2015

(54) METHODS AND SYSTEMS FOR ORGANIZING INFORMATION

(71) Applicant: Perinote LLC, Seattle, WA (US)

(72) Inventor: Peri Hartman, Seattle, WA (US)

(73) Assignee: Perinote LLC, Seattle, WA (US)

( * ) Notice: Subject to any disclaimer, the term of this patent is extended or adjusted under 35 U.S.C. 154(b) by 0 days.

(21) Appl. No.: 14/145,802

(22) Filed: Dec. 31, 2013

(65) Prior Publication Data

US 2014/0188946 A1 Jul. 3, 2014

Related U.S. Application Data

(60) Provisional application No. 61/747,551, filed on Dec. 31, 2012.

(51) Int. Cl.
*G06F 17/30* (2006.01)
(52) U.S. Cl.
CPC .................. *G06F 17/30958* (2013.01)
USPC ........... 707/738; 707/722; 707/736; 707/758; 707/821; 706/12; 706/14
(58) Field of Classification Search
None
See application file for complete search history.

(56) References Cited

U.S. PATENT DOCUMENTS

| 8,161,371 | B2 * | 4/2012 | Baldwin et al. | 715/208 |
| 8,584,022 | B1 * | 11/2013 | O'Shaughnessy et al. | 715/752 |
| 8,775,476 | B2 * | 7/2014 | Henderson | 707/798 |
| 8,812,439 | B2 * | 8/2014 | King et al. | 707/626 |
| 2003/0227487 | A1 * | 12/2003 | Hugh | 345/777 |
| 2004/0117727 | A1 * | 6/2004 | Wada | 715/500 |
| 2005/0027797 | A1 * | 2/2005 | San Andres et al. | 709/203 |
| 2005/0050537 | A1 * | 3/2005 | Thompson et al. | 717/165 |
| 2005/0228801 | A1 * | 10/2005 | Peters et al. | 707/100 |
| 2007/0061307 | A1 * | 3/2007 | Hartwell et al. | 707/3 |
| 2007/0061308 | A1 * | 3/2007 | Hartwell et al. | 707/3 |
| 2007/0299867 | A1 * | 12/2007 | Baldwin et al. | 707/103 R |

(Continued)

FOREIGN PATENT DOCUMENTS

| EP | 2063236 A1 | 6/2009 |
| WO | 2004044781 A2 | 5/2004 |

OTHER PUBLICATIONS

International Search Report and Written Opinion for International Application No. PCT/US2013/078548, mailed on Apr. 22, 2014.

*Primary Examiner* — Hung Le
(74) *Attorney, Agent, or Firm* — Jones W. Branch; Lowe Graham Jones PLLC

(57) ABSTRACT

Embodiments are directed towards organizing heterogeneous information items as nodes within a graph structure and/or a category, where each information item is implemented as a folder and each information item may be in more than one folder. An information management application residing within a computing device enables a user to integrate various information items of various types and sources using a many-to-many relationship for each information item. Information items include notes, events, contacts, geo-coordinates, hyperlinks such as Uniform Resource Locators (URLs), and messages (including emails, text messages). The application further allows the user to perform a variety of activities on the structure(s) and the information items, including, but not limited to creating an information item, creating one or more structures or relationship between information items, managing various views of the structure(s), and modifying the structure(s).

30 Claims, 19 Drawing Sheets

(56) References Cited

U.S. PATENT DOCUMENTS

| | | |
|---|---|---|
| 2008/0040126 A1* | 2/2008 | Estrada et al. .................... 705/1 |
| 2008/0040690 A1* | 2/2008 | Sakai ........................... 715/853 |
| 2008/0055354 A1* | 3/2008 | Miyazaki ....................... 347/19 |
| 2008/0082561 A1* | 4/2008 | Dere ............................ 707/101 |
| 2008/0183713 A1* | 7/2008 | Al-Attas et al. .................. 707/9 |
| 2009/0171897 A1* | 7/2009 | Spinola et al. ................... 707/3 |
| 2009/0171931 A1* | 7/2009 | Avitzur et al. ................... 707/5 |
| 2009/0172603 A1* | 7/2009 | Young Suk Lee ............. 715/854 |
| 2010/0082534 A1 | 4/2010 | Sagar |
| 2010/0169853 A1* | 7/2010 | Jain et al. ......................... 716/5 |
| 2011/0078016 A1* | 3/2011 | Wagenblatt et al. ....... 705/14.43 |
| 2011/0106846 A1* | 5/2011 | Matsumoto et al. .......... 707/769 |
| 2011/0229518 A1* | 9/2011 | Fomsgaard et al. ........ 424/209.1 |
| 2011/0264725 A1* | 10/2011 | Haeberle et al. .............. 709/203 |
| 2012/0143931 A1 | 6/2012 | Rosenberger |
| 2012/0174040 A1 | 7/2012 | Chen |
| 2012/0246115 A1* | 9/2012 | King et al. .................... 707/626 |

* cited by examiner

METHODS AND SYSTEMS FOR ORGANIZING INFORMATION

CROSS-REFERENCE TO RELATED APPLICATIONS

This application claims the benefit of U.S. Patent Application Ser. No. 61/747,551, filed on Dec. 31, 2012; the entire contents of which is incorporated herein by reference.

TECHNICAL FIELD

The present invention relates generally to organizing heterogeneous information and, more particularly, to an information management application for organizing heterogeneous information items such as notes, contacts, and calendar events, wherein each information item is implemented as a folder (node) within a directed graph structure, and any information item may be in more than one folder.

BACKGROUND

The human mind can understand complex associations between people and various activities, events, and entities. For example, it is not uncommon for a person to associate various activities with particular co-workers, in one context, and to also associate at least some of those same co-workers with completely different activities within a different context. Humans typically manage such complex mappings of associations on a daily basis to help organize their lives, work, and activities.

However, while humans can manage complex associations in their minds, many software applications tend to force disjointed or decoupled management of activities, events, contacts, notes, documents, content such as pictures, videos, illustrations, and music, web site links, and so forth. For example, many calendar applications limit the ability to manage contact relationships with calendar events. Moreover, adding text, calendared events, content, and the like to many of today's contact applications is also often restrictive. These limitations are often even more pronounced in software applications that run on mobile devices, such as smart telephones. Therefore, what is desired then is an application that allows a human to manage complex relationships between various software applications. Thus, it is with respect to these considerations and others that the invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
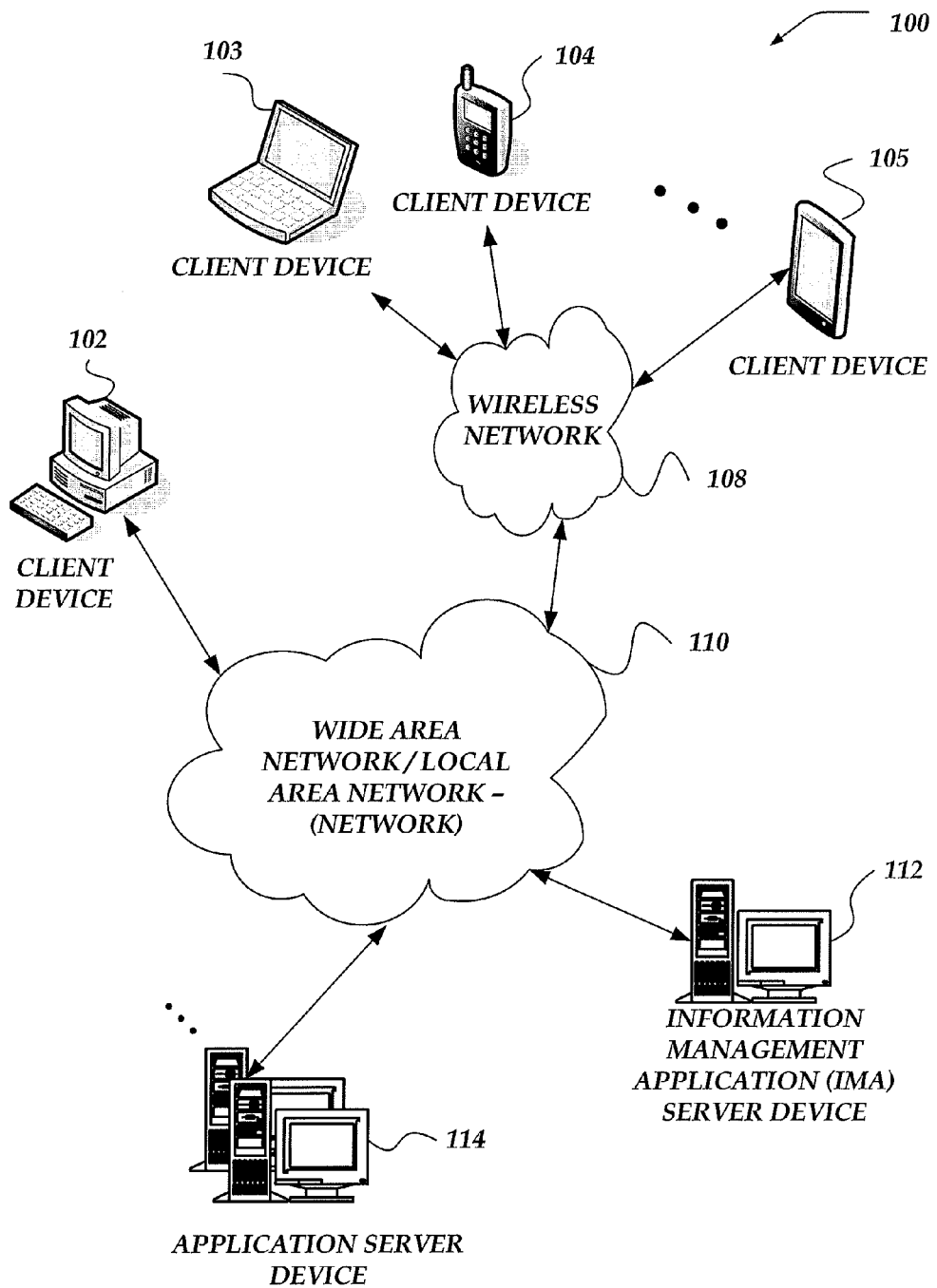
FIG. 1 illustrates a system environment in which various embodiments may be implemented.

Various embodiments will now be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

As used herein, the term "information item" refers to virtually any type of information item, including but not limited to activities, events, contacts, texts, emails, messages, notes, documents, geo-coordinates, hyperlinks such as Uniform Resource Locators (URLs), and content such as pictures, images, videos, illustrations, and music. Further, an information item may be an object, data structure, database content, or other digitally represented data record that identifies information content in addition to referencing related information items. The information content of an information item includes information specific to representing that information item. For example, in the case of a contact, the information content may be a name, address, telephone number, email address, or the like. In the case of a calendar event, the information content may be a date, time, event name, event location, and the like.

Each different type of information item may be controlled by one or more software applications, e.g., a calendar event may be controlled by a calendar application and a text message may be controlled by an MMS application. Further, each information item is enabled to operate as a folder in an Information Management Application (IMA) platform that is operating on at least one local computing device, and/or a remotely located computing device, such as a cloud based IMA platform. Each folder can be organized as a singular node, a child node folder or a parent node folder for one or more other information item folders in a directed graph structure, such as simple graphs, multi graphs, hyper graphs, complete graphs, cyclic graphs, wheel graphs, complete graphs, bipartite graphs, cube graphs, nested graphs, tree graphs, and the like. Each information item folder may be copied one or more times to one or more other information item folders organized in a graph structure on the IMA platform. In at least one of the various embodiments, heterogeneous information items which can be arranged in virtually any graph structure.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards organizing heterogeneous (different) information items as folders that operate as nodes within virtually any graph structure. The IMA platform may reside primarily on a local computing device, and/or a cloud based remotely located computing device. An Information Management Application (IMA) platform enables a user to select and organize various types of information item folders in one or more graph structures which are graphically displayed to a user by a computing device, such as a mobile computing device. Further, each information item folder may be organized to operate as a parent node or child node for any other information item folder in a graph structure that is based on a user graphically locating each folder in a Graphical User Interface provided by the IMA platform. Also, one or more information item folders can be generated for each information item.

Additionally, in at least one of the various embodiments, each information item may be provided to the IMA platform by one or more different sources, including but not limited to, local sensors on the computing device, software applications operating locally and/or remotely from the computing device, and third party services such as social networks, and cloud based software applications, and the like. In at least one embodiment, a GPS sensor operating locally on the computing device may provide geo-coordinate information items. Also, information items may contain or reference data from a variety of sources. For example, an information item may include information received from various sensors in a mobile computing device, such as a GPS, accelerometer, gyroscope, compass, or the like. As another example, an information item may include information received from an arbitrary third-party source, system, service, or the like. Such information could include social networking information (e.g., status updates, messages, contact information), online forum posts (e.g., message boards, discussion lists), news items, and the like.

In at least one of the various embodiments, an information item may be an object, data structure, database content, or other digitally represented data record that identifies information content in addition to referencing related information items. The information content of an information item includes information specific to representing that information item. For example, in the case of a contact, the information content may be a name, address, telephone number, email address, or the like. In the case of a calendar event, the information content may be a date, time, event name, event location, and the like.

In at least one of the various embodiments, the various types of information items may include, but are not limited to activities, events, contacts, texts, emails, messages, notes, documents, geo-coordinates, hyperlinks such as Uniform Resource Locators (URLs), and content such as pictures, images, videos, illustrations, and music. Further, each information item operating as a folder retains its ability to simultaneously provide features for the type for which the information item belongs. For example, a calendar event continues to function as such while being simultaneously organized as an information item folder in a directed graph; and so forth for each information item type. Also, the IMA platform enables a user to perform a variety of actions on information item folders included in the graph structure(s), including, but not limited to copying, deleting, editing, and creating an information item folder and organizing it with respect to one or more other information item folders. Additionally, the IMA platform enables a user to organize, create, delete, and modify various views of the graph structure(s), and so forth.

In at least one of the various embodiments, a user may share one or more information item folders with another user. Further, the user may share one or more graph structures that correspond to the shared information item folders. Additionally, in at least one of the various embodiments, a user may assign an access policy to information items and/or graph structures that are shared with other users so that access is limited to only particular other approved users. Furthermore, in at least one of the various embodiments, shared information item folders and/or graph structures may be stored in local databases for each shared user.

Also, in at least one of the various embodiments, the shared information item folders and/or graph structures may be stored in one or more remote multi-user databases that may be based in a cloud network and accessed by each shared user. Additionally, in at least one of the various embodiments, a cloud server may be arranged to communicate with a plurality of local user databases, remote multi-user databases, and remote user databases to ensure that their data for information items, information item folders, and graph structures is synchronized with each other. Further, in at least one of the various embodiments, just a portion of the data may be maintained and subsequently synchronized in the plurality of local user databases, remote user databases, and remote multi-user databases for information items, information item folders, and graph structures.

In at least one of the various embodiments, a category command can be provided that enables a shortcut for the sharing of information items and/or graph structures to more than one other user that was previously assigned to a particular category.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client devices 102-105, Information Management Application Server Device (IMASD) 112, and Information Management Application Archive Server Device (IMAASD) 114.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MN), an electronic serial number (ESN), or other device identifier. Such information may be provided in a network packet, or the like, sent between other client devices, IMASD 112, ASD 114, or other computing devices.

Client devices 102-105 may further be configured to include a client application, such as a browser, that enables an end-user to log into an end-user account that may be managed by an IMA platform operating on another computing device, such as IMASD 112, or the like. Such end-user account, in one non-limiting example, may be configured to enable the end-user to manage and organize heterogeneous (different) information items as nodes within a directed graph structure. However, participation in such management of information items may also be performed without logging into the end-user account. Rather, an IMA platform may be operating on a computing device, such as a smart mobile telephone, that is local to the end-user.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, RISD 112, TPSSD 114, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of IMASD 112 is described in more detail below in conjunction with FIG. 3. Briefly, however, IMASD 112 includes virtually any network device capable of supporting an IMA platform that is remotely located to the end-user. In some embodiments, IMASD 112 may enable multi-user mode of usage for the IMA platform, such that multiple users might share information items, and/or their underlying relationships in a directed graph structure organized separately for each user. Devices that may be arranged to operate as IMASD 112 include various network devices, including, but not limited to personal computers, desktop computers, multiprocessor systems, microprocessor-based or programmable consumer electronics, network PCs, server devices, network appliances, and the like.

Although FIG. 1 illustrates IMASD 112 as a single computing device, the invention is not so limited. For example, one or more functions of the IMASD 112 may be distributed across one or more distinct network devices. Moreover, IMASD 112 is not limited to a particular configuration. Thus, in one embodiment, IMASD 112 may contain a plurality of network devices. In another embodiment, IMASD 112 may contain a plurality of network devices that operate using a master/slave approach, where one of the plurality of network devices of IMASD 112 operates to manage and/or otherwise coordinate operations of the other network devices. In other embodiments, the IMASD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of Application Server Device (ASD) 114 is described in more detail below in conjunction with FIG. 3. Briefly, however, ASD 114 includes virtually any network device capable of providing third-party services and/or information items, to users of client devices 102-105. ASD 114 may include, but is not limited to, personal information manager services, web-based email services, storage services, text messaging, calendar services, video streaming services, document management services, social media services, or the like. Devices that may be arranged to operate as ASD 114 include various network devices, including, but not limited to personal computers, desktop computers, multiprocessor systems, microprocessor-based or programmable consumer electronics, network PCs, server devices, network appliances, and the like.

Although FIG. 1 illustrates ASD 114 as a single computing device, the invention is not so limited. For example, one or more functions of the ASD 114 may be distributed across one or more distinct network devices. Moreover, ASD 114 is not limited to a particular configuration. Thus, in one embodiment, ASD 114 may contain a plurality of network devices. In another embodiment, ASD 114 may contain a plurality of network devices that operate using a master/slave approach, where one of the plurality of network devices of ASD 114 operates to manage and/or otherwise coordinate operations of the other network devices. In other embodiments, the ASD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2A:
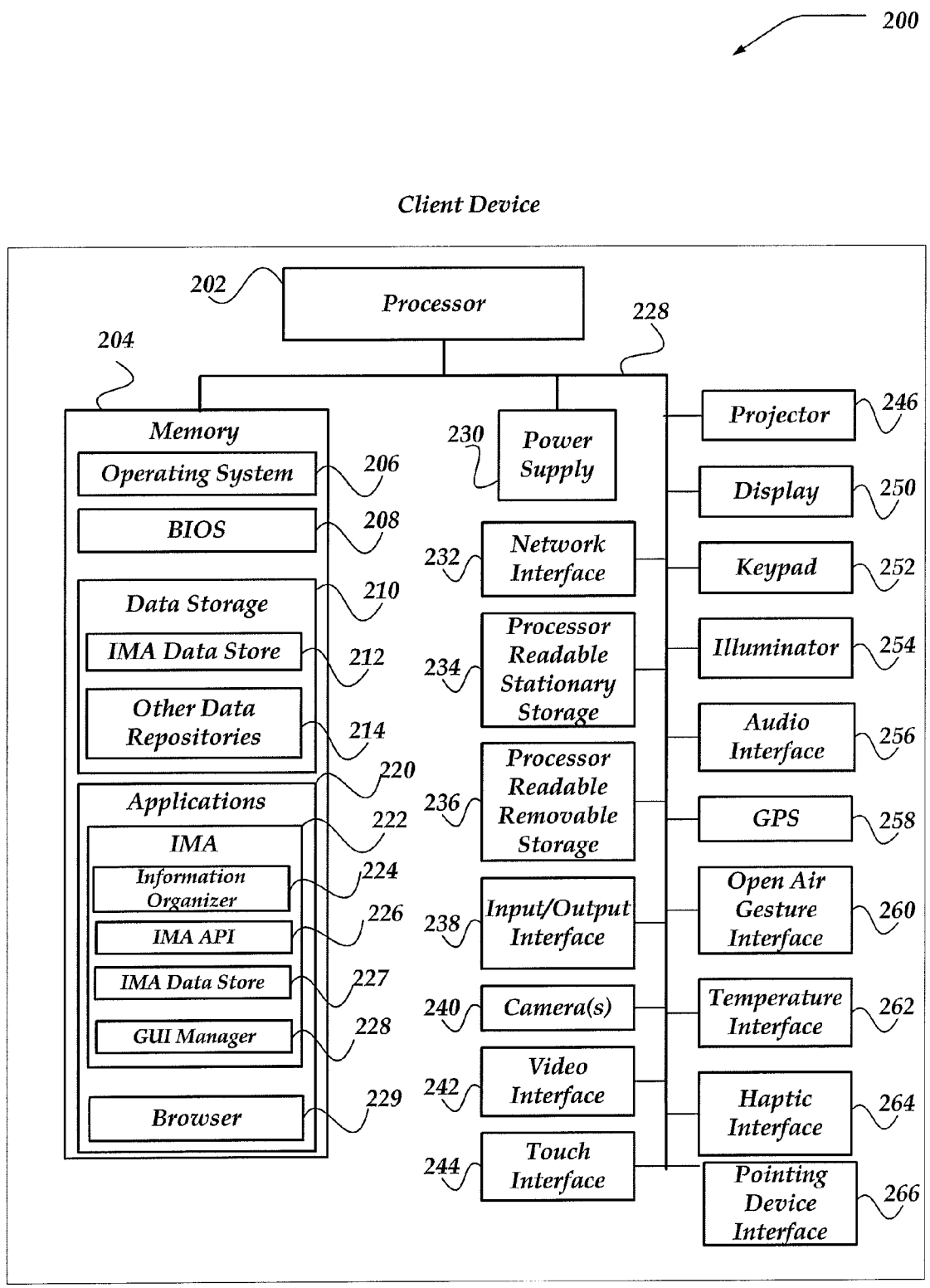
FIG. 2A shows one embodiment of a client device that may be included in various embodiments.

FIG. 2A shows one embodiment of client device 200 that may include many more or less components than those shown. Client device 200 may represent, for example, at least one embodiment of client devices shown in FIG. 1.

Client device 200 may include one or more processor (central processing unit or CPU) 202 in communications with memory 204 via bus 228. Client device 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client device 200 may optionally communicate with a base station (not shown), or directly with another computing device. And in one embodiment, although not shown, a gyroscope may be employed within client device 200 to measuring and/or maintaining an orientation of client device 200. Also not shown, one or more accelerometers may be employed within client device 200 to measure the acceleration and/or orientation of client device 200.

Power supply 230 may provide power to client device 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client device 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client device 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computing device. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client device is powered. Also, illuminator 254 may backlight these buttons in various patterns when particular actions are performed, such as dialing another client device. Illuminator 254 may also cause light sources positioned within a transparent or translucent case of the client device to illuminate in response to actions.

Client device 200 may also comprise input/output interface 238 for communicating with external peripheral devices or other computing devices such as other client devices and network devices. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client device. For example, the haptic interface 264 may be employed to vibrate client device 200 in a particular way when another user of a computing device is calling. Temperature interface 262 may be used to provide a temperature measurement input and/or a temperature changing output to a user of client device 200. Open air gesture interface 260 may sense physical gestures of a user of client device 200, for example, by using single or stereo video cameras, radar, a gyroscopic sensor inside a device held or worn by the user, or the like. Camera 240 may be used to track physical eye movements of a user of client device 200.

GPS transceiver 258 can determine the physical coordinates of client device 100 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAT), Enhanced Timing Advance (ETA), Base Station Subsystem (BSS), or the like, to further determine the physical location of client device 200 on the surface of the Earth. It is understood that under different conditions, GPS transceiver 258 can determine a physical location for client device 200. In at least one embodiment, however, client device 200 may, through other components, provide other information that may be employed to determine a physical location of the device, including for example, a Media Access Control (MAC) address, IP address, and the like.

Human interface components can be peripheral devices that are physically separate from client device 200, allowing for remote input and/or output to client device 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

Client device 200 may include browser 229 that is configured to receive and to send web pages, web-based messages, graphics, text, multimedia, and the like. The client device's browser 229 may employ virtually any programming language, including a wireless application protocol messages (WAP), and the like. In at least one embodiment, browser 229 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client device 200. The memory may also store operating system 206 for controlling the operation of client device 200. It will be appreciated that this component may include a general-purpose operating system such as a version of UNIX, or LINUX™, or a specialized mobile computer communication operating system such as iOS™, Android™, Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client device 200 to store, among other things, applications 220 and/or other data. For example, data storage 210 may also be employed to store information that describes various capabilities of client device 200. The information may then be provided to another device based on any of a variety of events, including being sent as part of a header during a communication, sent upon request, or the like. Data storage 210 may also be employed to store information including address books, buddy lists, aliases, user profile information, contacts, notes, events, folders, or the like. Data storage 210 may further include program code, data, algorithms, and the like, for use by a processor, such as processor 202 to execute and perform actions. In one embodiment, at least some of data storage 210 might also be stored on another component of client device 200, including, but not limited to, non-transitory (computer) processor-readable removable storage device 236, processor-readable stationary storage device 234, or even external to the client device.

Data storage 210 may include, for example, Information Management Application (IMA) data store 212. In some embodiments, IMA data store 212 may store data that is used generated by, associated with, or otherwise accessible and/or used by applications/platforms, such as IMA 222. Such IMA data may be used by other modules, or applications, and may store or otherwise represent information items. The IMA data store 212 may be or include a relational database that includes tables that represent information items. The IMA data store 212 may also include a file system or other storage abstraction for storing other kinds of data such as image files, audio files, and the like that may be referenced by information items.

Applications 220 may include computer executable instructions which, when executed by client device 200, transmit, receive, and/or otherwise process instructions and data. Applications 220 may include, for example, Information Management Application (IMA) 222. Other examples of application programs include browser 229, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

IMA 222 operates as a platform that includes information organizer 224, graphical user information (GUI) manager 228, and IMA application program interface (API) 226. In one embodiment, IMA data store may reside within IMA 222.

Information organizer 224 performs information management functions. For example, the information organizer 224 manages the creation, deletion, modification, and access of information items. As noted, information items may be or include notes, calendar events, contacts, projects, external data objects or files, and the like. An information item may be an object, data structure, database content, or other digitally represented data record that identifies information content in addition to referencing related information items. The information content of an information item includes information specific to representing that information item. For example, in the case of a contact, the information content may be a name, address, telephone number, email address, or the like. In the case of a calendar event, the information content may be a date, time, event name, event location, and the like.

Information items may contain or reference data from a variety of sources. For example, an information item may include information received from various sensors in a mobile computing device, such as a GPS, accelerometer, gyroscope, compass, or the like. As another example, an information item may include information received from an arbitrary third-party source, system, service, or the like. Such information could include social networking information (e.g., status updates, messages, contact information), online forum posts (e.g., message boards, discussion lists), news items, and the like.

GUI manager 228 provides a view and a controller that facilitate user interaction with IMA 222 and its various components. For example, GUI manager 228 may provide interactive access to the IMA 222, such that users can create, delete, associate, view, or otherwise manage information items. In some embodiments, access to the functionality of GUI manager 228 may be provided via a Web client, possibly executing as another application, such as browser 229.

IMA API 226 provides programmatic access to one or more functions of IMA 222. For example, IMA API 226 may provide a programmatic interface to one or more functions of IMA 222 that may be invoked by other applications or some other module. In this manner, IMA API 226 facilitates the development of third-party software, such as user interfaces, plug-ins, news feeds, adapters (e.g., for integrating functions of IMA 222 into Web applications), and the like. In addition, IMA API 226 may be in at least some embodiments invoked or otherwise accessed via remote entities, such as other systems or devices, to access various functions of IMA 222. For example, an email system or calendar server may provide, configure, or otherwise interact with information items managed by IMA 222 via IMA API 226. As another example, IMA API 226 may support implementation of a server-side, hosted, or "UI-less" IMA, in which the core functionality of the IMA is performed on shared system that is accessed via user interfaces executing on various types of client devices, including mobile devices, desktop systems, and the like.

IMA data store 227 is used by the other modules of IMA 222 to store and/or communicate information. The components of IMA 222 use IMA data store 227 to store and otherwise represent information items. IMA data store 227 may be or include a relational database that includes tables that represent information items. IMA data store 227 may also include a file system or other storage abstraction for storing other kinds of data such as image files, audio files, and the like that may be referenced by information items. In some embodiments IMA data store 227 may be replaced by or used in conjunction with IMA data store 212.

While IMA 222 is disclosed above as residing within client device 200, in some embodiments, some or all of IMA 222 may also reside within a remote server device, such as IMASD 112 of FIG. 1, to enable multi-user access, synchronization services, and/or otherwise enable remote execution of some or all of IMA 222.

Illustrative Network Device

Figure 2B:
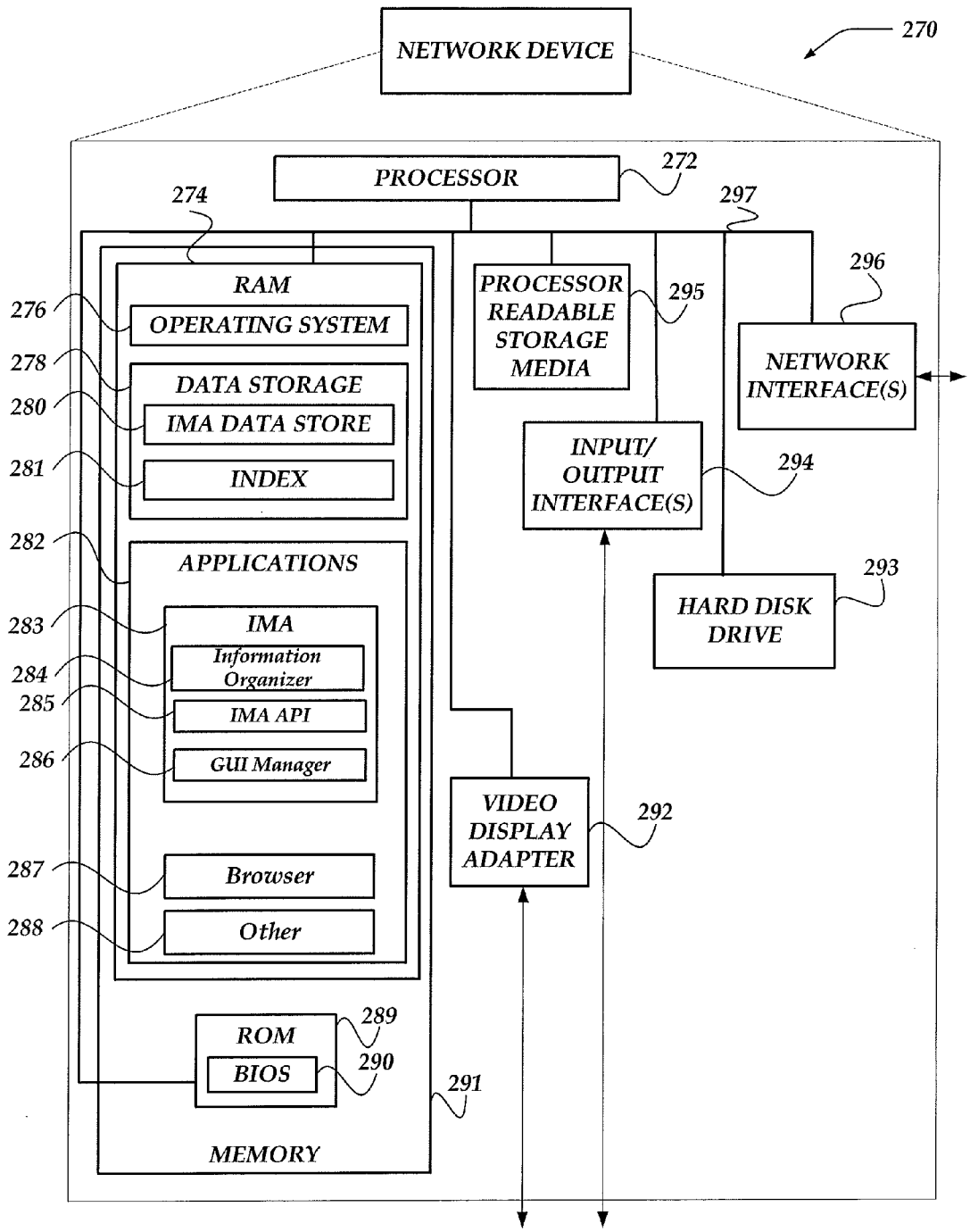
FIG. 2B illustrates one embodiment of a network device that may be included in various embodiments.

FIG. 2B shows one embodiment of a network device 270, according to one embodiment of the invention. Network device 270 may include many more or less components than those shown. The components shown, however, are sufficient to disclose an illustrative embodiment for practicing the invention. Network device 270 may be configured to operate as a server, client, peer, a host, or any other device. Network device 270 may represent, for example IMASD 112 and/or ASD 114 of FIG. 1, and/or other network devices.

Network device 270 includes processor 274, processor readable storage media 295, network interface unit 296, an input/output interface 294, hard disk drive 293, video display adapter 292, and memory 291, all in communication with each other via bus 297. In some embodiments, processor 272 may include one or more central processing units.

As illustrated in FIG. 2B, network device 270 also can communicate with the Internet, or some other communications network, via network interface unit 296, which is constructed for use with various communication protocols including the TCP/IP protocol. Network interface unit 296 is sometimes known as a transceiver, transceiving device, or network interface card (NIC).

Network device 270 also comprises input/output interface 294 for communicating with external devices, such as a keyboard, or other input or output devices not shown in FIG. 2B. Input/output interface 294 can utilize one or more communication technologies, such as USB, infrared, Bluetooth™, or the like.

Memory 291 generally includes RAM 274, ROM 289 and one or more permanent mass storage devices, such as hard disk drive 293, tape drive, optical drive, and/or floppy disk drive. Memory 291 stores operating system 276 for controlling the operation of network device 270. Any general-purpose operating system may be employed. Basic input/output system (BIOS) 290 is also provided for controlling the low-level operation of network device 270.

Although illustrated separately, memory 291 may include processor readable storage media 295. Processor readable storage media 295 may be referred to and/or include computer readable media, computer readable storage media, and/or processor readable storage device. Processor readable storage media 295 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 291 further includes one or more data storage 278, which can be utilized by network device 270 to store, among other things, applications 282 and/or other data. For example, data storage 278 may also be employed to store information that describes various capabilities of network device 270. The information may then be provided to another device based on any of a variety of events, including being sent as part of a header during a communication, sent upon request, or the like. Data storage 278 may also be employed to store messages, web page content, or the like. At least a portion of the information may also be stored on another component of network device 270, including, but not limited to processor readable storage media 295, hard disk drive 293, or other computer readable storage medias (not shown) within client device 270.

Data storage 278 may include a database, text, spreadsheet, folder, file, or the like, that may be configured to maintain and store user account identifiers, user profiles, email addresses, IM addresses, and/or other network addresses; or the like. Data storage 278 may further include program code, data, algorithms, and the like, for use by a processor, such as processor 272 to execute and perform actions. In one embodiment, at least some of data store 278 might also be stored on another component of network device 270, including, but not limited to processor-readable storage media 295, hard disk drive 293, or the like.

Data storage 278 may include IMA data store 280 and/or index 281. IMA data store 280 may include a plurality of user data stores for a plurality of different users (e.g., individual user data stores). In some embodiments, IMA data store 280 may include a generic data store that may be utilized to generate a generic index of relevant items for the plurality of users. Each user data store in IMA data store 280 may include a plurality of information items and/or user behaviors that are associated with user that corresponds to the data store. In at least one embodiment, IMA datastore 280 may operate as a multi-user database that can be accessed by a plurality of users, and/or employed to synchronize at least a portion of it's data at local user databases and/or remote user databases. In at least one other embodiment, it may operate as a local database for a user.

Index 281 may include a plurality of indexes of relevant items for a plurality of different users (e.g., individual indexes). In some embodiments, index 281 may include a generic index of relevant items that may be utilized to determine ranked relevant items across the plurality of users in response to a query by a user. Index 281 for a user may include an entry for each item in user data store 280 for that user) and s those items that are relevant to the entry. In some embodiments, the relevant items for an entry may be pre-ranked based on a degree of relevancy to the entry item.

In a manner somewhat similar to applications 220 that may reside on client device 200, applications 282 may include computer executable instructions which, when executed by network device 270, transmit, receive, and/or otherwise process instructions and data. Applications 282 may include, for example, Information Management Application (IMA) 283. Other examples of application programs include browser 288, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

IMA 283 operates as a platform that includes information organizer 284, graphical user information (GUI) manager 287, and IMA application program interface (API) 285.

Information organizer 284 performs information management functions. For example, the information organizer 284 manages the creation, deletion, modification, and access of information items. As noted, information items may be or include notes, calendar events, contacts, projects, external data objects or files, and the like.

GUI manager 287 provides a view and a controller that facilitate user interaction with IMA 283 and its various components. For example, GUI manager 287 may provide interactive access to the IMA 283, such that users can create, delete, associate, view, or otherwise manage information items. In some embodiments, access to the functionality of GUI manager 287 may be provided via a Web client, possibly executing as another application, such as browser 288.

IMA API 285 provides programmatic access to one or more functions of IMA 283. For example, IMA API 285 may provide a programmatic interface to one or more functions of IMA 283 that may be invoked by other applications or some other module. In this manner, IMA API 285 facilitates the development of third-party software, such as user interfaces, plug-ins, news feeds, adapters (e.g., for integrating functions of IMA 283 into Web applications), and the like. In addition, IMA API 285 may be in at least some embodiments invoked or otherwise accessed via remote entities, such as other systems or devices, to access various functions of IMA 283. For example, an email system or calendar server may provide, configure, or otherwise interact with information items managed by IMA 283 via IMA API 285. As another example, IMA API 285 may support implementation of a server-side, hosted, or "UI-less" IMA, in which the core functionality of the IMA is performed on shared system that is accessed via user interfaces executing on various types of client devices, including mobile devices, desktop systems, and the like.

IMA data store 280 is used by the other modules of IMA 283 to store and/or communicate information. The components of IMA 280 use IMA data store 280 to store and otherwise represent information items. IMA data store 280 may be or include a database that includes tables that represent information items. IMA data store 280 may also include a file system or other storage abstraction for storing other kinds of data such as image files, audio files, and the like that may be referenced by information items. In some embodiments IMA data store 280 may be replaced by or used in conjunction with another IMA data store included with IMA application 283.

While IMA 283 is disclosed above as residing within network device 270, in some embodiments, some or all of IMA 283 may also reside within a local device, such as client devices 102, 103, 104 and 105 of FIG. 1, to enable multi-user access, synchronization services, and/or otherwise enable remote execution of some or all of IMA 283.

Generalized Operation

The operation of certain aspects of the invention will now be described with respect to FIGS. 3A-C, which illustrate one embodiment of a process diagram usable to manage information items as folders within a graph structure. The process shown in FIGS. 3A-C may be implemented and executed within one or more of client devices 122-130 illustrated in FIG. 1. In some embodiments, at least some of the illustrated actions may also be implemented with IMASD 112 of FIG. 1.

As shown, the process provides one embodiment of a plurality of actions that may be used to organize heterogeneous information items within an IMA platform executing on one or more non-transitory processors. It should be understood that the actions disclosed are directed towards providing an overview of some of the possible actions that may be performed upon the information items, and that other actions are disclosed in other sections of this specification. Moreover, FIGS. 3A-C are not intended to illustrate a user interface, as any of a variety of user interfaces may be used without limiting the invention. For example, touch screens provide for a variety of approaches, as do audio command input interfaces. Thus, any of these, as well as others may be used. Further, a particular computing device, and/or operating system may provide additional interface mechanisms that may readily be leveraged by the IMA platform disclosed herein.

Figure 3A:
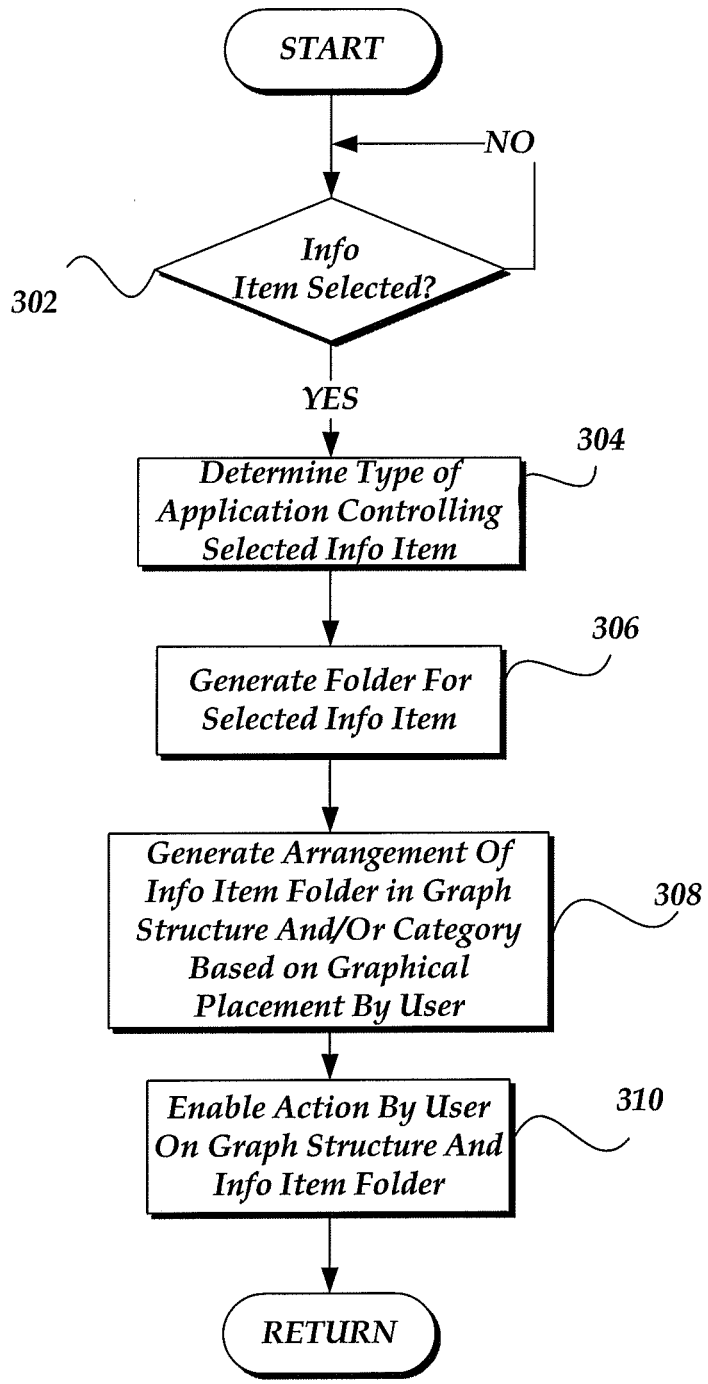
FIGS. 3A-C illustrate embodiments of process diagrams usable to manage information items as folders within a directed graph structure.
Figure 3B:
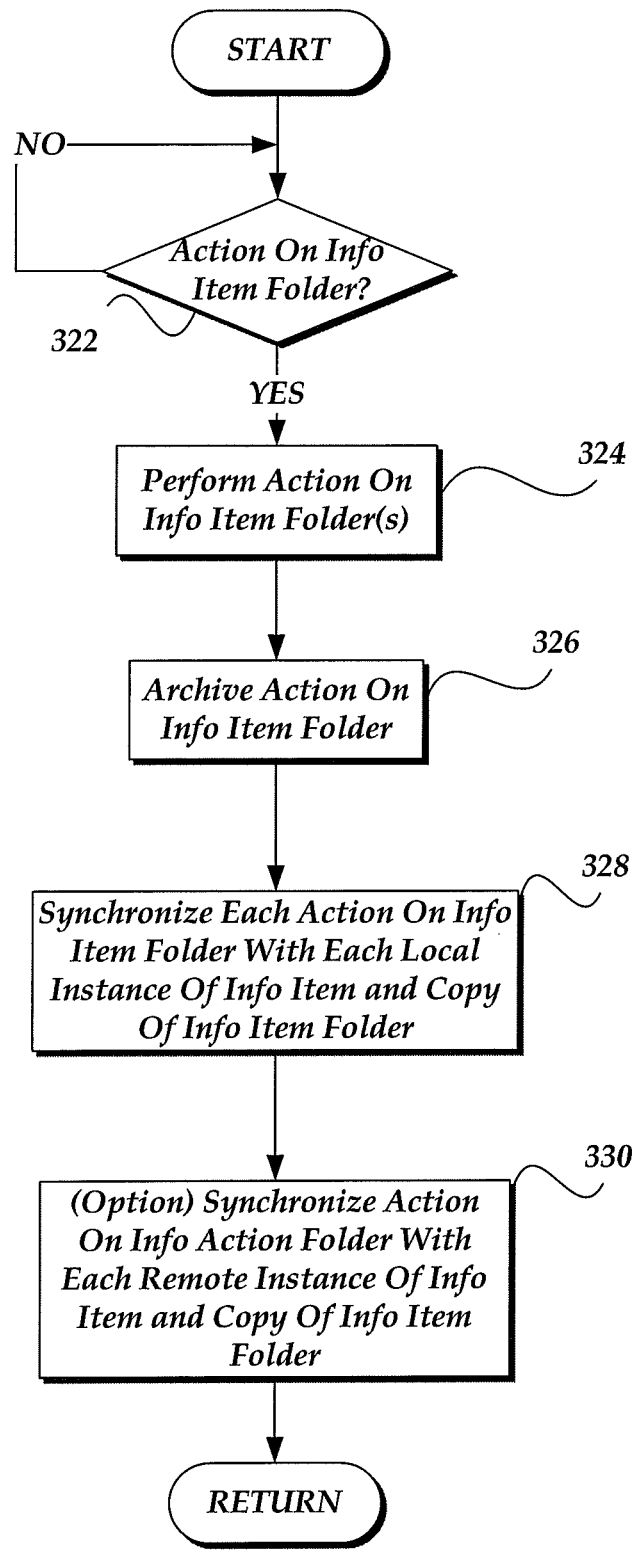
Figure 3C:
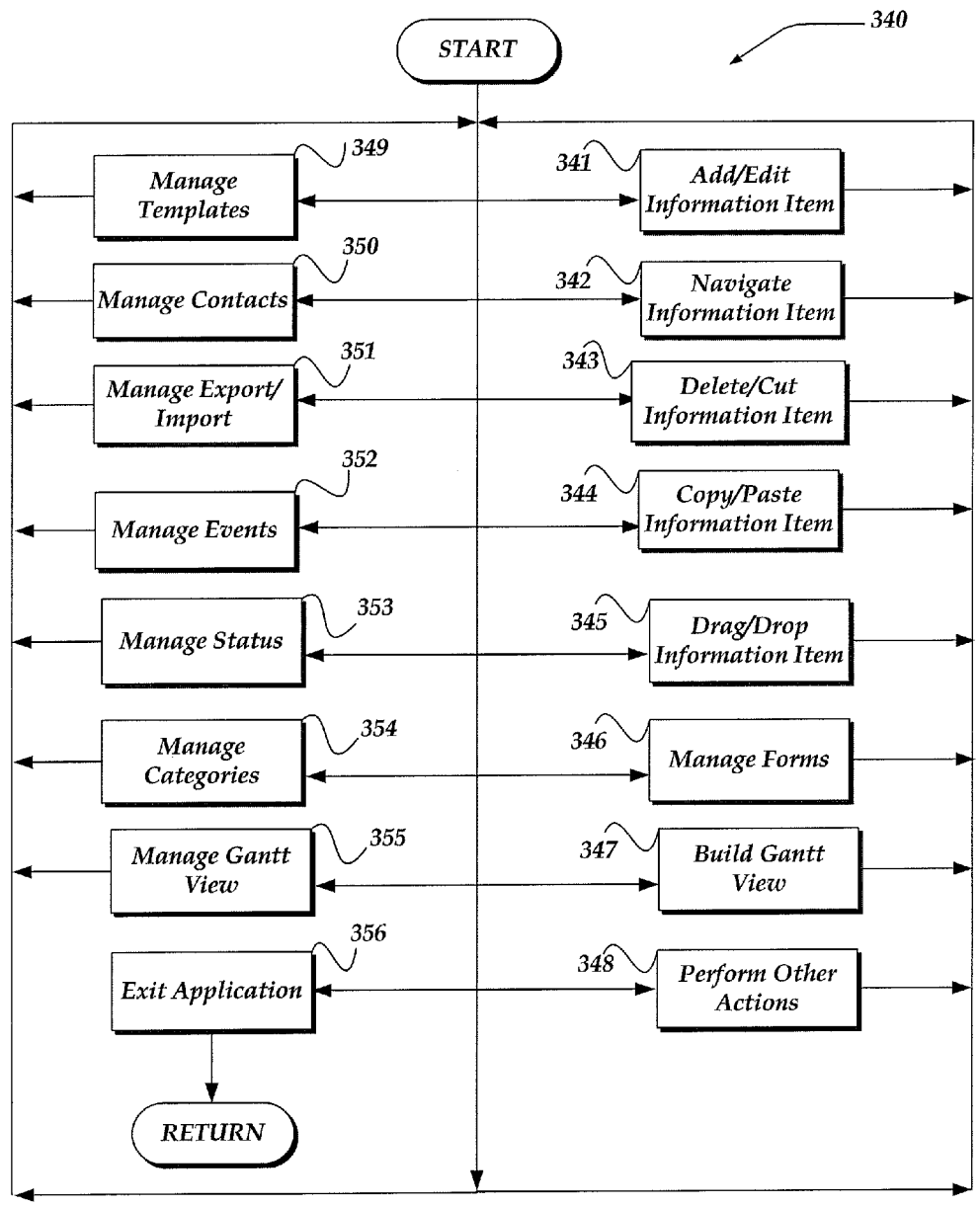

Generally, when a user accesses the IMA platform, any one or more of the actions illustrated in FIGS. 3A-C may be performed. However, some of the actions make logical sense to be performed prior to entering other actions. For example, until an information item is added, it might not make sense to manage an information item, such as an event, contact, or the like.

In FIG. 3A, the process moves from a start block to decision block 302 where an information item is selected by the user. In at least one embodiment, the selected information item may have been previously created. However, in at least one other embodiment, the user may select to generate a new information item.

If the determination at decision block 302 is false, the process loops back to decision block 302. However, when the determination is true, the process advances to block 304 where a type of a native application that controls the information item is determined, e.g., a browser for a hyperlink, a calendar application for an event, a word processing program for a document, and the like. In this way, when the IMA platform is called upon to change an information item in response to an action by a user, it is changing the actual information item maintained by the native application, such as a calendared event maintained by a calendar application or a contact maintained by a contact application.

Stepping to block 306, a folder is generated for the selected information item. Moving to block 308, the generated information item folder is arranged in a graph structure based on a user graphically placing the folder within an existing graph structure or a new graph structure. In at least one embodiment, the newly generated information item folder may be placed within an existing information item folder that is positioned in an existing graph structure.

The process flows to block 310 where the user is enabled to perform actions on the generated information item folder or its corresponding graph structure. Next, the process returns to performing other actions.

In FIG. 3B, the process moves from a start block to decision block 322 where a determination is made as to whether or not a user has initiated an action in regard to an information item folder. If false, the process waits until the determination is true, and then advances to block 324. At block 324, the action is performed on an Information Item folder.

In at least one embodiment, the user may perform one or more actions, e.g., modifying an event for a calendar, editing a contact, nesting an information item folder in another information item folder, assigning an information item folder to a category, and the like. In at least one embodiment, the user may select a relationship for a next information item folder, or may first add an information item folder, and then identify the relationship between previously added information item folders. As discussed elsewhere, the relationship may be identified by moving one information item folder within another information item folder. As each information item operates as a folder, this may involve opening the parent information item folder and moving the information item into the folder, or using any of a variety of other mechanisms, including dragging and dropping one information item folder onto another information item folder. Again, it is noted that unlike other systems, each added information item immediately becomes a folder when selected in the IMA platform.

Additionally, when the IMA platform is called upon to change an information item folder in response to an action by the user, IMA is changing the actual information item maintained by the native application, e.g., a calendared event maintained by a calendar application or a contact maintained by a contact application.

Also, in at least one of the various embodiments, a user may perform the action of sharing one or more information item folders with another user. Further, the user may share one or more graph structures that correspond to the shared information item folders. Additionally, in at least one of the various embodiments, a user may assign an access policy to information items and/or graph structures that are shared with other users so that access is limited to only particular other approved users.

Moving to block 326, the action performed on the information item folder is archived. In at least one embodiment, the archiving is done either locally and/or remotely to a user's computing device.

At block 328, each action performed on each information item folder is synchronized with each local instance of copies of the information item folder and the information item maintained by its native application. Optionally, at block 330, each action performed on each information item folder is synchronized with each remote instance of copies of the information item folder and the information item remotely maintained by its native application on a remote data store, which may be based in a cloud network. Also, in at least one of the various embodiments, the shared information item folders and/or graph structures may be stored in one or more remote multi-user databases that may be based in a cloud network and accessed by each shared user.

Additionally, in at least one of the various embodiments, a cloud server may be arranged to communicate with a plurality of local user databases, remote multi-user databases, and remote user databases to ensure that their data for information items, information item folders, and graph structures is synchronized with each other. Further, in at least one of the various embodiments, just a portion of the data may be maintained and subsequently synchronized in the plurality of local user databases, remote user databases, and remote multi-user databases for information items, information item folders, and graph structures.

Furthermore, in at least one of the various embodiments, shared information item folders and/or graph structures may be stored in local databases for each shared user, remote user databases, and/or remote multi-user databases. Also, in at least one of the various embodiments, the shared information item folders and/or graph structures may be stored in one or more remote multi-user databases and/or remote user databases that may be based in a cloud network and accessed by each shared user. Next, the process returns to performing other actions.

In FIG. 3C, a process is shown for performing actions on information items and information item folders. After a start block, the process moves to block 341 when no information item presently exists. At block 341, a user is enabled to add one or more information items. As discussed below in more detail in conjunction with FIGS. 4-8, a user may enter and define information items along with their information type, and other characteristics. For example, as information item is entered (added), a relationship between the information items may also be provided. Using the User Interface (UI) the user may provide a plurality of information items, including whether at least one information item is of a different type than another information item. For example, the user may enter and define one information items as a note, another as a contact, and still another as an event, such as a calendar event. Other information items types described elsewhere may also be entered. FIG. 8 as discussed further below illustrates one mechanism for defining the information item type, although other mechanisms may also be employed.

As information items are entered, relationships between at least some of the plurality of information items may be generated using a directed graph structure. A non-limiting example of such a structure is shown in FIGS. 4-11, and 14, and discussed further below. FIG. 3A also provides a flow diagram of one embodiment of a process for adding and displaying within a graphical structure heterogeneous information items. Moreover, block 341 provides for editing of the information items, and/or content associated with one or more of the information items. Thus, as discussed elsewhere, a user might edit various features for an information item, including a name, text, date information, or the like.

Generally, after one or more add actions and/or zero or more edits are performed, block 341 may be exited. Until the user selects to exit the application, in one embodiment, the process might loop or otherwise, perform other actions, until the user makes a selection of another action to perform. Thus, unless there is a logical dependency relationship between the action blocks shown in FIG. 3C, the user may at any time enter virtually any of the blocks shown. Thus, for example, assuming that the user has first added a contact, or event through block 341, the user may then select to enter block 350, or block 352, as well as other blocks. Therefore, the following discussion should not be construed as necessarily being order dependent beyond that of having selected information entered into the application before performing an action on that information.

Thus, having information items in the application, one may then enter block 342, where the user may employ any of a variety of navigation mechanisms to navigate through various screen displays of the information. In some computing devices, the user might employ a touch screen that enables the user to swipe through a plurality of window screens to display multiple views, and thereby navigate through the generated directed graph structure. However, the user is not constrained to this mechanism.

For example, a displayed graph structure might be traversed using various input selection devices, forward or backward through the directed graph until the user reaches a desired location within the graph display. In another embodiment, the user might also perform various search mechanisms, by entering search criteria into a screen. Such searches might include deep or recursive searches, shallow searches using for example filters, or the like. For some computing devices, various buttons, arrows, or the like, may also be employed to navigate the graph structure. Upon completion of block 342, processing may then branch to another block based on another user selection.

Block 343 may be entered when a user selects to perform a deletion or cut of one or more information items. Deletions and cuts are described in more detail below. Briefly, however, a user may select to delete a node relationship, for example, that may affect another node. For example, referring to FIG. 14, as shown, information item 1421 is a node that is seen as a common child node to parent nodes 1411 and 1412. Cutting or otherwise deleting the relationships (links) between the parent nodes might, in some embodiments, result in an alert to the user that node 1421 is an orphan node. Such orphan nodes might be deleted, be sent to a clipboard, or have another action taken, as discussed further below.

Should the user delete or otherwise cut a relationship such as between node 1401 and node 1411, then several actions may occur, regarding nodes 1421 and 1422. Since each of these child nodes are also linked to another parent node (1412, and/or 1402), node 1421 might be retained, an alert to the user may be provided requesting the user how to manage the child nodes, or to provide information to the user indicating other references in the graph structure to the children nodes. Other actions may also be performed. In any event, upon completion of block 343, the user may then select to re-enter block 343, or select a different action.

At block 344, the user may perform copy/paste actions, which are described in more detail below. Briefly, however, at block 344, in one embodiment, actions performed using the copy/paste functions may include sending copied nodes to a clipboard, and pasting from the clipboard into a desired location within the graph structure.

At block 345, drag/drop actions may be performed as described in more detail below. In one embodiment, for example, the user may highlight or otherwise identify the information to be relocated, and then drag the highlighted information to the desired location. Releasing or dropping the information might remove the highlighting. In one embodiment, drag/drop might not employ a clipboard.

At block 346, forms may be managed as described in more detail below, including for example generating forms useable for contacts and/or events. It should be noted that entry of information need not employ a form, and may also be entered using 'free-form' mechanisms.

At block 347, a user may select to build a Gantt chart view for one or more relationships between information items. Building and subsequently managing Gantt views (block 355) are described in more detail below. Briefly, however, a Gantt view may be created (built) using a project node's context menu and dragging nodes into the Gantt view to create an activity node with a link to the dragged-in node.

At block 349, a user may select to manage templates, including creating templates. In one embodiment, an existing project can be used as a template to start another project, provide a view of at least a portion of a graph structure, or display other information, such as described below in conjunction with FIG. 16.

For example, a template might be created by starting with an existing structure, and stripping out node specific information. The template may then be modified to manage other views.

At block 350, the user may select to manage contacts, including relationships between various other independent items and contact information item types. Managing contacts is described in more detail below. Briefly, however, in one embodiment, contacts may include a predefined node that roots all other contact nodes. As such, adding a contact information item type may result in creating a child dependency to the contact root node. As discussed elsewhere, contact nodes may then be sorted, viewed, filtered, or have a variety of other actions performed upon them. As noted, in some embodiments, a contact operates as a folder, enabling other children nodes to be within the contact information item, such as is discussed in more detail in conjunction with FIG. 11.

Manage exports/imports of information including information items may be performed within block 351, as described in more detail below. Briefly, however, any of a variety of information within the application may be exported to another computing device, synchronized with another data service, and/or imported to add to, delete from, or otherwise modify an existing graph structure and related information.

At block 352, the user may select to manage events, such as calendar events, as described in more detail below. Briefly, a calendar event is an information item that operates as a folder being a node within the graph structure. Moreover, in some embodiments, an event may have associated with various time related information, such as a start time, an end time. In one embodiment, the event may include an action that the user is to perform. As an aside, a task is similar to an event, except a task may not include a specific time, but may have a reminder, and may further include a state. Such states might, for example, include: to be done, waiting for . . . ; completed; or any of a variety of conditions. As such, block 352 may also be employed to manage tasks.

At block 353, the user may manage a variety of status indictors associated with an information item. In some embodiments, the status indicator may be displayed with an information item, and flow with other (if it exists) text. Various status indicators might include, but are not limited to: date information, task identifiers, category membership information, or the like.

At block 354, the user may elect to manage various categories, as described in more detail below. Briefly, a category operates as an organizational aid to associate various information items. In one embodiment, a category is a node designated specifically as a category. Categories may then be used to manage views of nodes, including providing views in as a structured network. As such a category may then be a parent or child node.

Block 348 represents a variety of other actions that may be performed by the application, which are described in more detail below. Some of the other actions include, but are not limited to managing calendars, managing notes, performing ordering, performing tagging, sorting, performing searches, and the like. It should therefore be recognized that the actions illustrated in FIG. 3C are not to be construed as exhaustive, but merely represents some of the many actions that a user may perform to organize and manage heterogeneous information within a single application, where a plurality of information items are nodes within a directed graph, and are implemented as folders such that each information item may be in more than one folder, and further each information item may reside in more than one folder.

At block 356, the user may select to exit the application at any time, including without selecting any of the other actions. When the user does select to exit, various data may be stored or otherwise securely saved for future actions. Next, the process may then return to a calling process.

As discussed elsewhere, unlike traditional systems, where a user might be able to include various items such as a document, a graphic, or the like, into a structure having folders, the present embodiments represent each node information item as a folder that may then include other information items, which in turn operate also as folders.

It will be understood that figures, and combinations of steps in the flow diagram-like illustrations, can be implemented by computer program instructions. These program instructions may be provided to a processor to produce a machine, such that the instructions, which execute on the processor, create means for implementing the actions specified in the flow diagram block or blocks. The computer program instructions may be executed by a processor to cause a series of operational steps to be performed by the processor to produce a computer implemented process such that the instructions, which execute on the processor to provide steps for implementing the actions specified in the flow diagram block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flow diagram illustration, and combinations of blocks in the flow diagram illustration, can be implemented by modules such as special purpose hardware-based systems which perform the specified actions or steps, or combinations of special purpose hardware and computer instructions.

Integrating Information Items

As disclosed above IMA 222 of FIG. 2A may employ a process such as described above in conjunction with FIGS. 3A-C to integrate information items of various types and sources using a many-to-many relationship for each information item. IMA 222 may allow creation, editing, viewing, importing, exporting, altering relationships, and synchronization with other storage of the information items. Non-limiting, non-exhaustive examples of information items include text, contacts, calendar events, tasks, photos, spreadsheets, URLs, voice clips, and the like.

It is noted that IMA 222 may also integrate, manage, and organize information items, namely bodies of data and references to: any external database entity and any type of file that can reside on a computer's storage; computer software for integrating, managing, and organizing information items from various sources, namely from direct input to a user's computer, from any sensory internal or external hardware, from files on a user's computer, from data transferred from other computers or network based services to a user's computer; computer software for maintaining a many-to-many relationship between information items and allowing creation, editing, viewing, importing, exporting, and altering relationships between information items, and synchronization, namely propagation among computers and services of changes, additions, or deletions to information items.

The following discussions are directed towards providing further detail, including non-limiting, non-exhaustive examples for managing organizing information items as nodes within a directed graph structure, where each information item is implemented as a folder and each information item may be in more than one folder.

General Description of Integrating Information Items

As discussed above, IMA 222 allows the user to take and organize notes, contacts, and calendar events into folders. The IMA 222 performs its actions by:

1 Every information item (e.g., note, contact, event) as a folder,
2 An information item can be in more than one folder (not copies, but actually be in two folders at the same time).

Each information item acts like a folder as described above. There are various actions for showing a folder and its contents, adding information items (e.g., a note, contact, or an event) to a folder, removing an information item, and the like. One can also view the entire set of contacts or a selected date range of the calendar without exiting IMA 222 and using some other application to do so. Thus, IMA 222 allows for managing heterogeneous information items within the same application, rather than needing to employ a plurality of different applications. That is, while some approaches may allow multiple notes in a folder, these approaches often do not allow or otherwise provide for a hierarchy of notes so that the user can organize their notes as they would organize files in a file system. Furthermore, prior approaches do not provide the flexibility of adding notes to a contact or events in combination with a general information hierarchy.

Moreover, IMA 222 includes a mechanism for opening multiple windows, each window showing a user-selected folder. By horizontal swiping over a screen display, the user can quickly switch from window to window.

Example Features for Integrating Information Items

Example embodiments may include or provide one or more of the following features/aspects:

Information Item types: In general, every information item is implemented as a node within a directed graph and each node then is configured as a folder (in that it may have one or more related information items or children). Moreover, every folder is also an information item. Information item types may generally include notes, events, and contacts. Information item types may also include HTTP links, links to files (e.g., spreadsheet, photo, voice clips) on the user's device, embedded files, other network resources (e.g., shared files).

User interface aspects: In one implementation, a current view displayable through a Graphical User Interface is a parent node/folder and a list of children nodes/folders. Other implementations may allow one or more of: viewing a collapsible network structure; creation of user-defined forms to change what is displayed for an information item; and showing (possibly using user-defined forms) some information items bound with their parent node/folder (e.g., a photo with a list of contacts and a descriptive note that appear when viewing the photo).

File system: In some embodiments, the described structure employed by the IMA may replace a user interface for a computer's file system user interface. For example, on Windows or Mac OS, the file system is represented as a hierarchy of folders, where the contents of folders can be folders or files. In contrast, with the example system, the file system may be or include any or all of the types of information items described herein, completely integrated. That is, the structure embodied by the IMA is employed for the operating system's file system as well.

Equivalence between tasks and calendar events: in some embodiments, tasks and calendar events are the same thing. In traditional systems, tasks and events are considered different and the user manipulates them differently. If they are fundamentally the same, they may be presented differently in a user interface by making minor changes to display attributes.

Global search algorithm: A "deep" search typically starts at some user-selected "search root" node and continues recursively through child nodes looking for all nodes matching some search criterion. An alternative way to search, which may be more efficient under some conditions, is to first do a "flat" search through all nodes in the database for those matching the criterion. Then for each match, looks "upwards" to determine if the node is "under" the search root.

Reminders implemented as projects: A project may be represented as two or more tasks or events with a start time and an end time (or in the case of a task, an elapsed amount of time) and having interdependencies. A reminder is an antecedent of a "subject" event—that is, the reminder occurs X amount of time before the event. This is essentially a project where the reminder is event A and the subject is event B and event B follows event A.

User defined forms: By default, a node is displayed with a list of child nodes underneath. The user may want to group certain child information together in a structured way (e.g., for a contact or for a product description). Forms may be defined by a collection of fields. Each field may be identified by a tag. A field may be a single information item or a nested form. When loading data, the system may look for rows matching the tags and pull those values into the form. In some embodiments, since a form can contain a form, lists and other complex arrangements are possible.

Form families: By allowing one level of indirection, rather than assigning a form type directly to a node, some embodiments enable assigning a family of forms. Then, the user can switch among different forms to view a node depending on whether the user wants to see, for example, the brief version or the detail version. This mechanism also serves as a way to provide a read-only default presentation of a node—the version one might see until clicking on the node to begin editing (at that point a writable form would open).

Folders are categories: Folders are effectively a visual presentation of categories. Because an item can be placed in any number of folders, it can belong to any number of categories. A user interface display for a category can be built on top of the folders by having the user select certain folders to be called categories. Then, when the user wishes to assign categories to an item, a popup window could present the folders designated as categories, and the user could select the appropriate ones. In some embodiments, the presentation in the selection window could be arranged hierarchically.

Synchronization algorithm: Some embodiments implement a synchronization algorithm to synchronize information items between different devices or systems, as described further below in the Functional Specification section.

Context sensitive favorites: The list of favorites in a favorites menu may dynamically and change depending on what node the user is viewing.

Task-Event-Project view: This special view, grouped by date, allows a user to see everything, across all projects that he has scheduled for a particular day or range of days.

Storing a sequence of children: In some embodiments, the user can reorder the children of a node into virtually any order, including excluding sorted lists, such as contacts and calendar events. Some approaches to ordering children will store, for every parent, the list of children and a sequence number for each child. Other embodiments take an "inverted" approach, by storing, for every child, its sequence number for each of its parents.

Context filtering: Show or hide child nodes based on the parent. For example, a user may have several projects over time. Each project involves several consultants or employees. For each, the user maintains a collection of notes (or other items). Now, when the user views the items for a particular employee, the user will see all of his notes, across all projects. That may be desirable, but in other cases the user may wish to see only the notes relevant to the project. Context filtering, based on the parent of the employee (which would be project in this example), may be used to show only the notes relevant to that project.

User Interface Screens in an Example Embodiment for Integrating Information Items The following employs FIGS. 4-13 to provide one non-limiting, non-exhaustive example of employing user interface screens, to manage information items and their relationship to other information items. As discussed above, the screens illustrated in FIGS. 4-13 may be managed through IMA 222 of FIG. 2.

Figure 4:
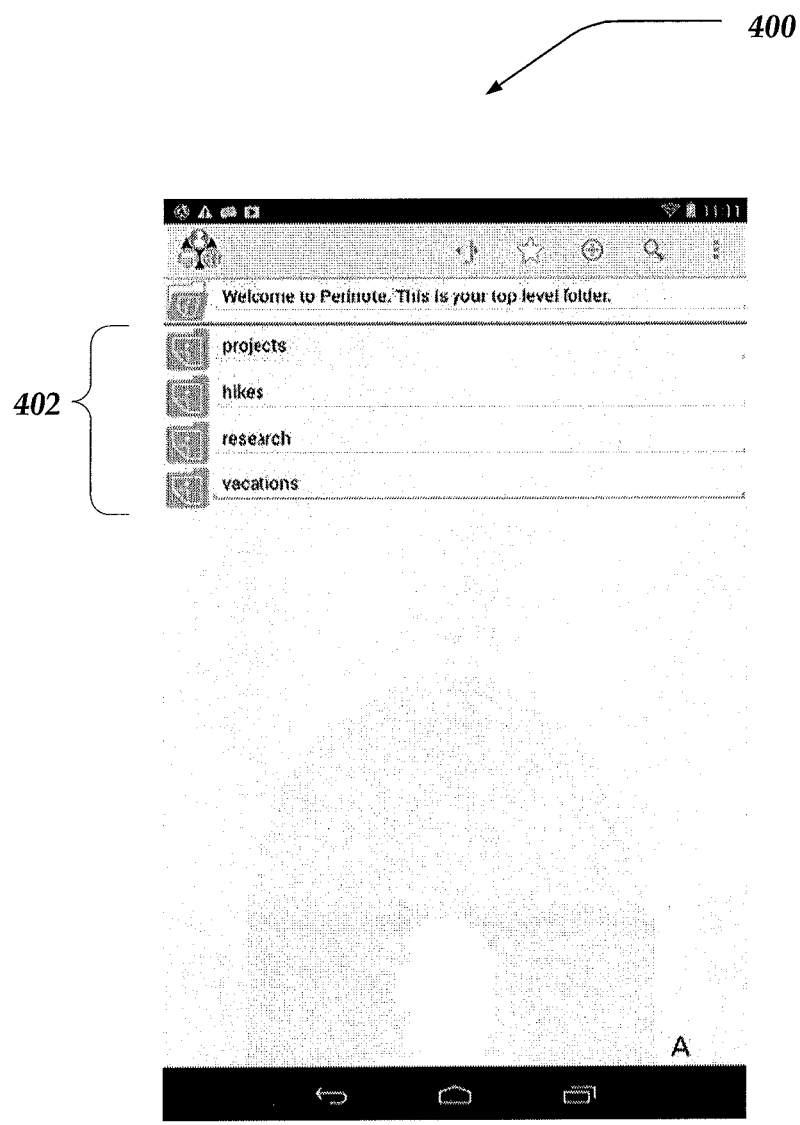
FIG. 4 illustrates a screenshot of one embodiment, showing a home view usable to manage information items.

FIG. 4 illustrates screenshot 400 as one embodiment of a User Interface of a home view with a plurality of information items 402 operating as folders. In one embodiment, screenshot 400 illustrates a top level of folders for a user that has previously added information items 402. As shown, information items 402 may represent the information item type of notes. However, other information items types may also be represented, in addition, or instead.

Figure 5:
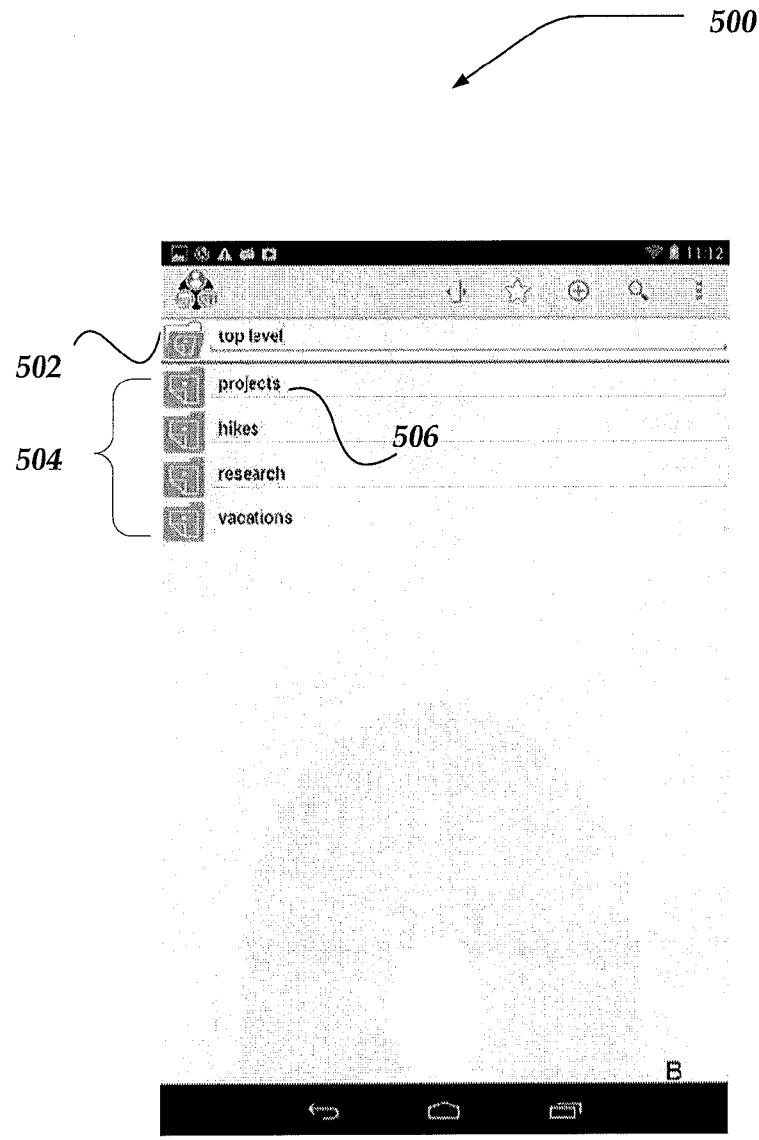
FIG. 5 illustrates a screenshot of one embodiment, showing a view where the root folder has been renamed.
Figure 6:
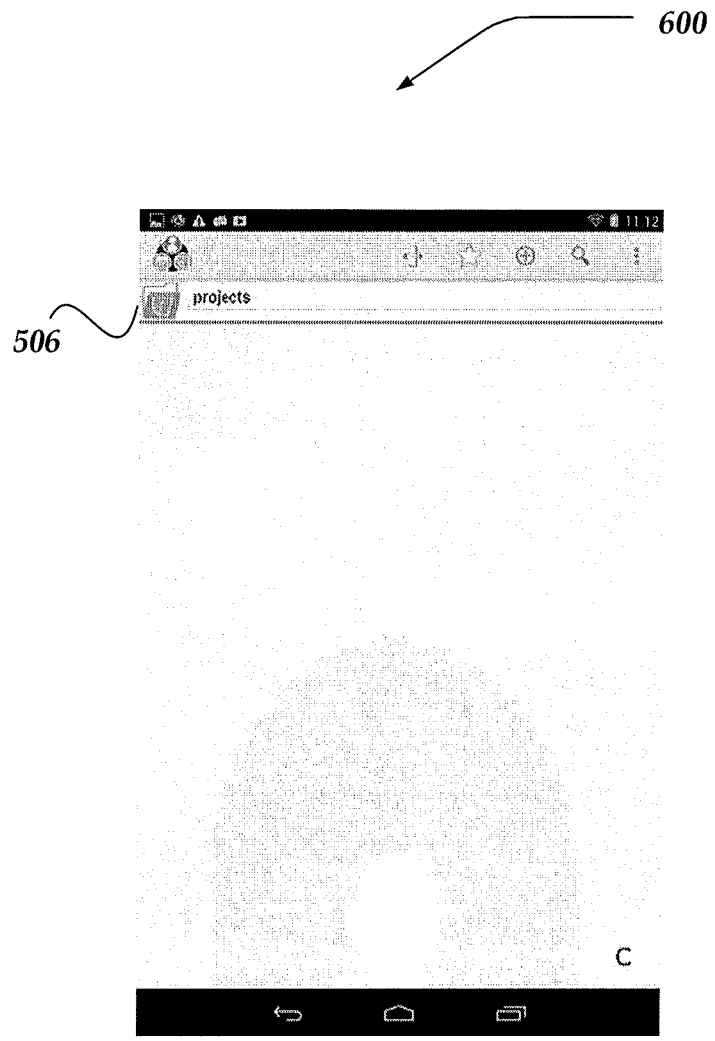
FIG. 6 illustrates a screenshot of one embodiment, showing a view generated by clicking on a "projects" folder.

In a directed graph, the plurality of information items 402 may link to a top node, sometimes herein referred to a top, root, or reference node, which in some embodiments, is not displayed. However, as shown in FIG. 5, screenshot 500 provides one non-limiting embodiment, showing a view where the root node/folder 502 is illustrated. Children information items 504 are again illustrated 'below' root node/folder 502.

Various mechanisms may be employed within screenshot 500 to select one or more of information items 504. For example, within a touch screen interface, the user may select, for example, information item 506, by tapping over the icon. By selecting an information item, such as information item 506, a display of the contents of the selected information item may be displayed. One non-limiting example of a screenshot 600 shows a view generated by clicking on the "projects" folder (information item 506) shown in FIG. 5. The "projects" folder is displayed at the open folder. In this example, information item 506 does not include content (children information items).

Figure 7:
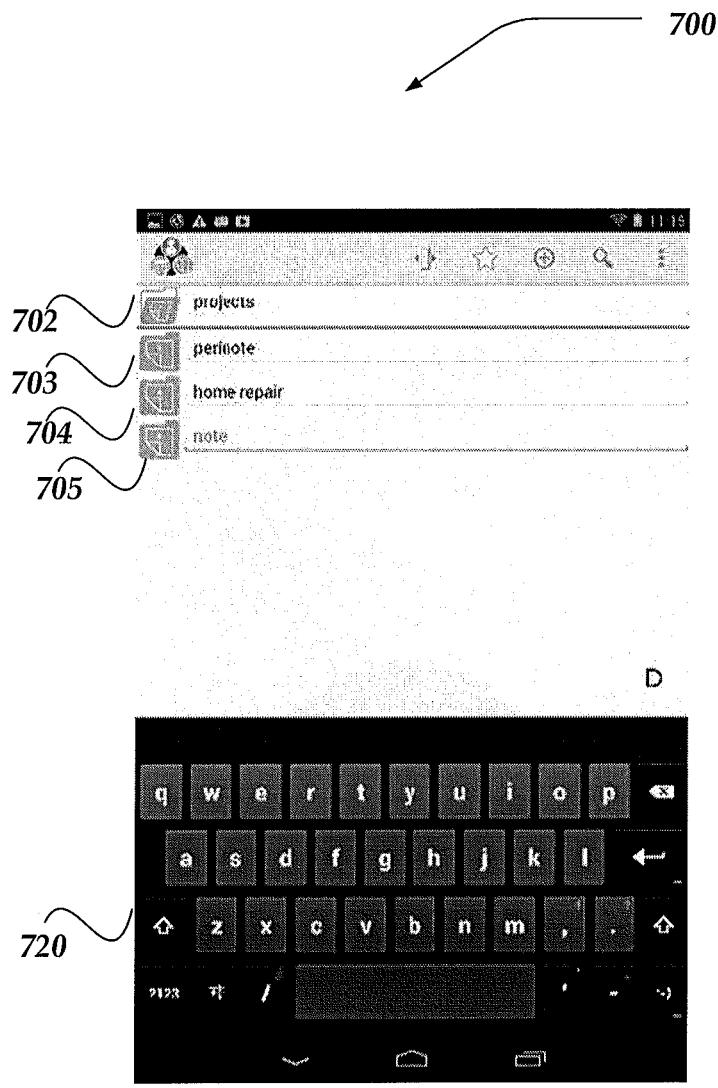
FIG. 7 illustrates a screenshot of one embodiment, showing a view where contents have been added to a "projects" folder.
Figure 8:
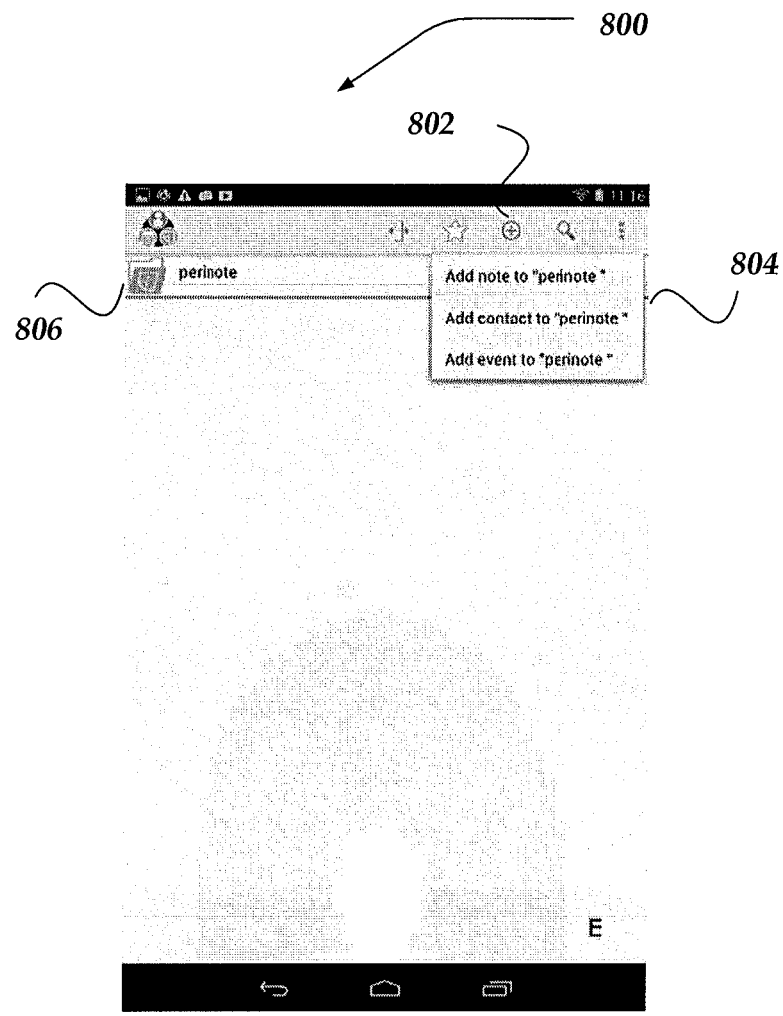
FIG. 8 illustrates a screenshot of one embodiment, showing a view including a dropdown menu.

However, FIG. 7 illustrates one embodiment of screenshot 700 where children information items 703-705 are illustrated within parent information item 702. Information items 702-705 are each folders, where information items 703-705 are illustrated as note types. Information item 705 is illustrated as 'grayed' to indicate one mechanism for indicating that the note is started, but currently does not include related text. Also shown in screenshot 700 is keyboard 720 representing another non-limiting mechanism for entering textual information.

FIG. 8 illustrates a screenshot 800 of one embodiment of a mechanism for adding an information item as a child to a selected parent information item 806. In this example, selecting icon 802 results in menu window 804 being displayed. Also, in this example, the user is provided with an ability of selecting for addition different information item types, including notes, contacts, or events. However, other information item types may also be displayed for selection within window 804.

Figure 9:
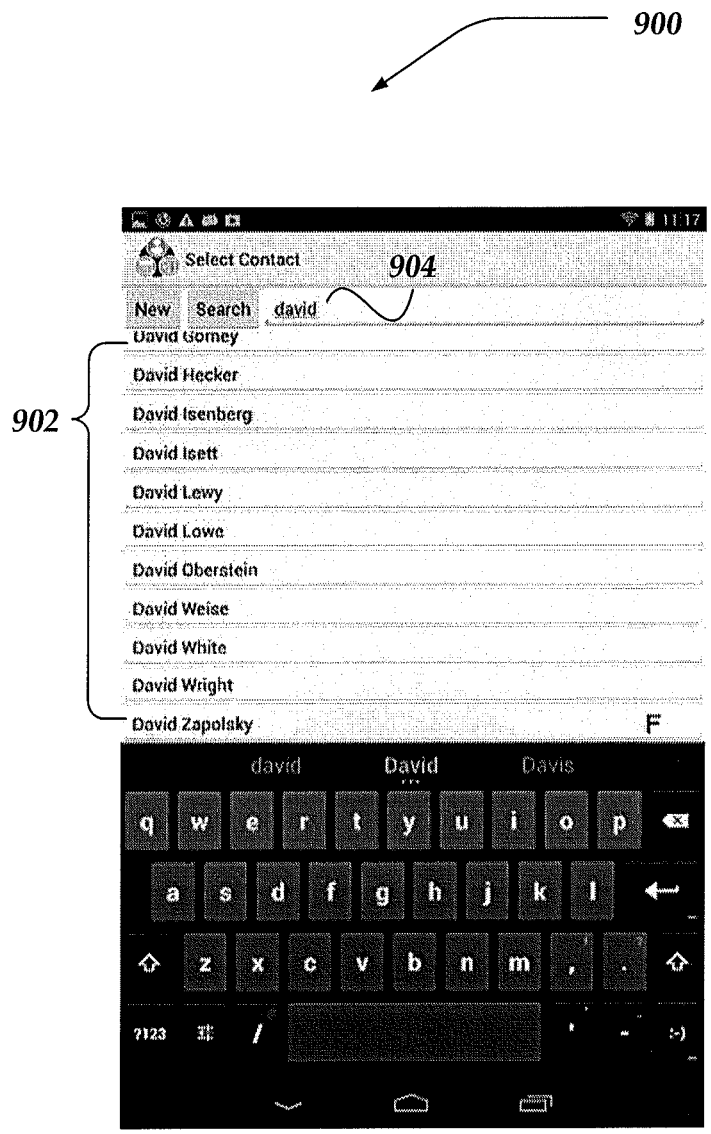
FIG. 9 illustrates a screenshot of one embodiment, showing a view including the results of the user selecting to add a contact in FIG. 8.
Figure 10:
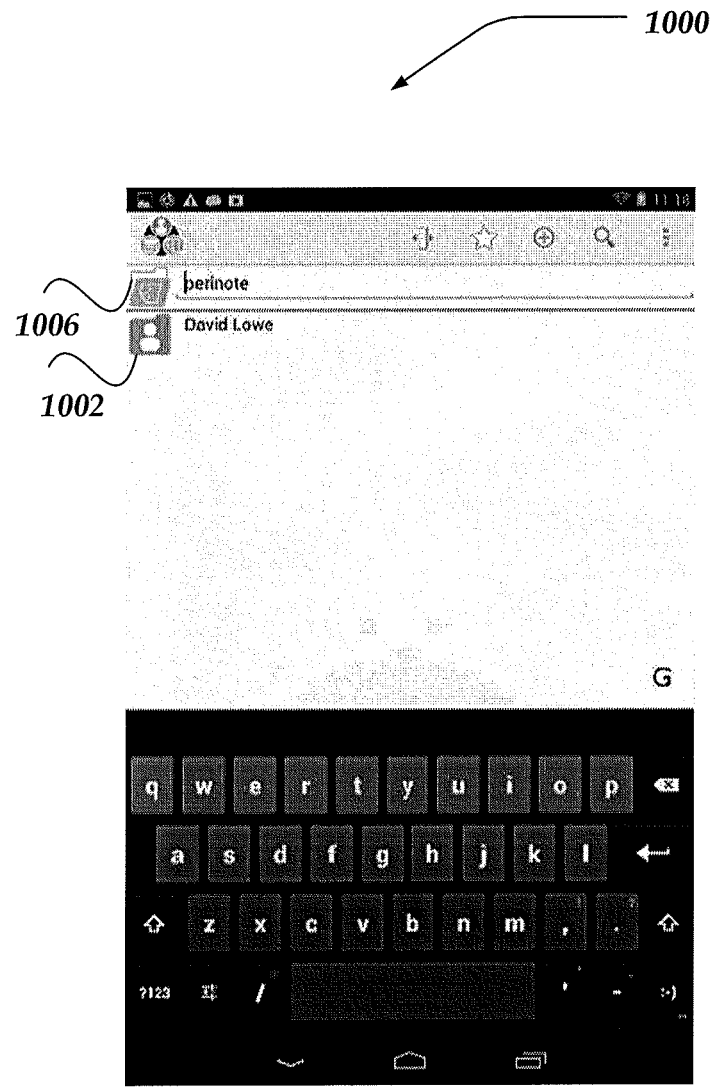
FIG. 10 illustrates a screenshot of one embodiment, showing a view including the results of the user selecting a contact.

For example, should the user select to add a contact information item type, a screenshot showing the user's available contact information items might be displayed. In some embodiments, the user may filter the displayed list using a search mechanism. Thus, FIG. 9 illustrates screenshot 900 of one embodiment showing a view of a filtered set of contacts 902 based on the filter 904. Selection of one of the contacts within the set of contacts 902 is shown in screenshot 1000 of FIG. 10. As shown in screenshot 1000, the selected contact information item 1002 is now displayed as a child folder within the information item 1006, which is of information type note. Thus, as shown, because each information item is a folder, a note may include within it a contact, which in turn is a folder.

Figure 11:
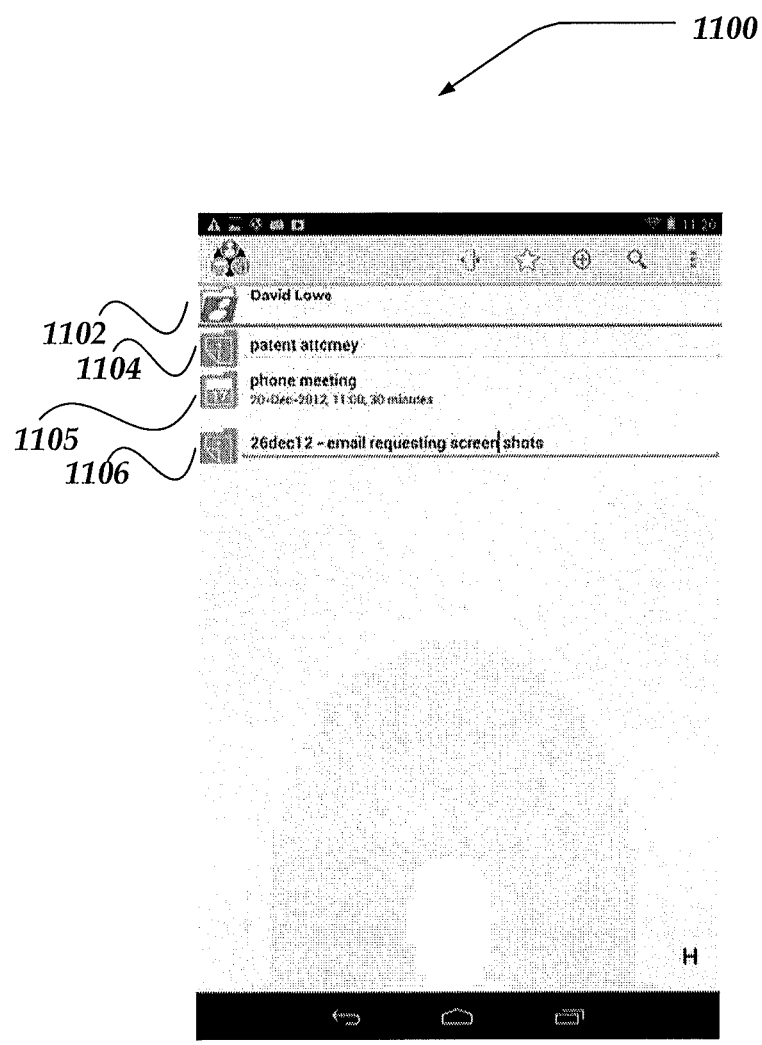
FIG. 11 illustrates a screenshot of one embodiment, showing a view including the results of the user selecting a contact in FIG. 10.

Employing similar actions as discussed above, information item 1102 within screenshot 1100 of FIG. 11, which is a folder of information type contact, may then include a variety of other information item types. As shown, information item 1102 includes information items 1104 and 1106, which represent note information item types, and item 1105 which represents a calendar event type.

The above examples therefore illustrate a directed graph structure of heterogeneous information item types, wherein each information item operates as a folder that may include other heterogeneous information item types.

Figure 12:
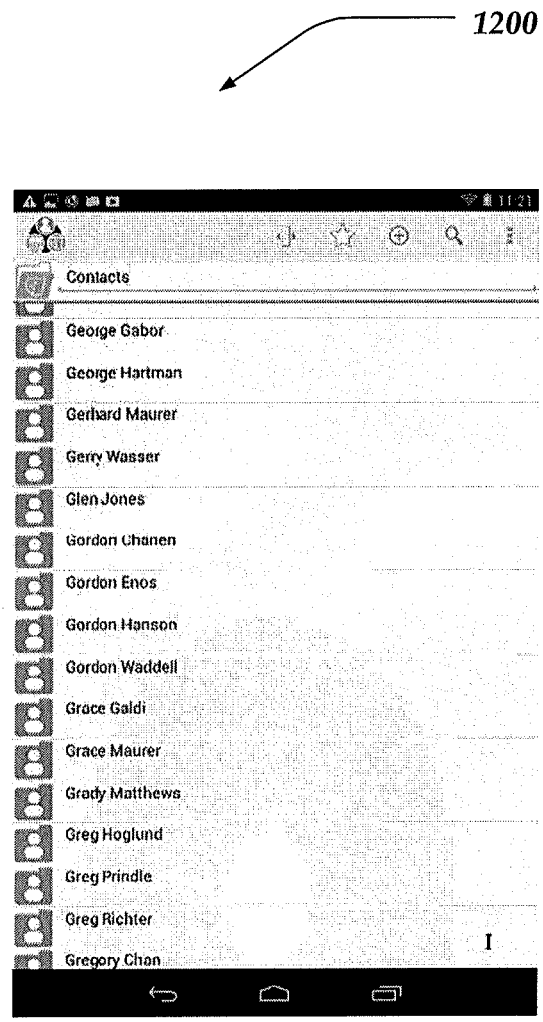
FIG. 12 illustrates a screenshot of one embodiment, showing a view including a special folder that lists contacts.
Figure 13:
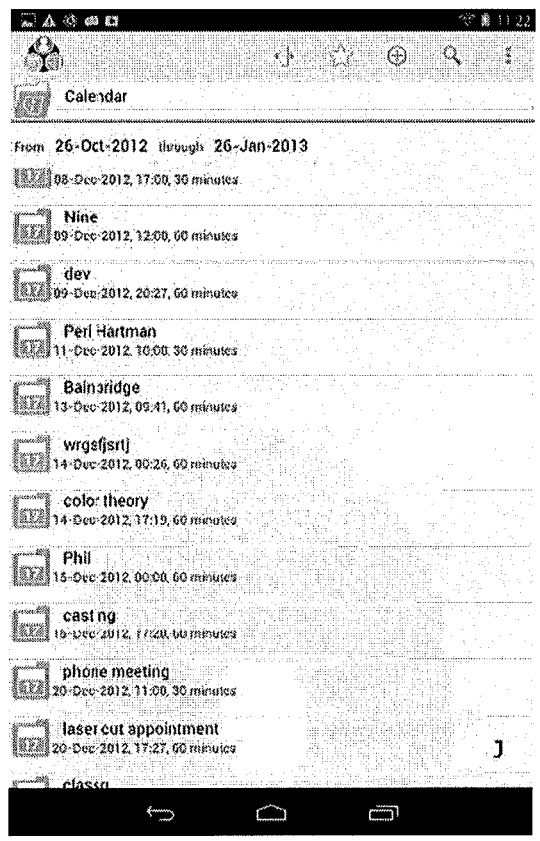
FIG. 13 illustrates a screenshot of one embodiment, showing a view including a special folder that lists calendar events, within a given date range.

Managing views allows the user to perform a variety of actions. FIG. 12 illustrates one embodiment of screenshot 1200 that shows a view of contacts folder that includes a listing of a user's contacts. FIG. 13 illustrates a screenshot 1300 showing another view of a calendar information item having calendar events within a given date range that the user might have entered using a filter search.

Functional Figures for Integrating Information Items

Figure 14:
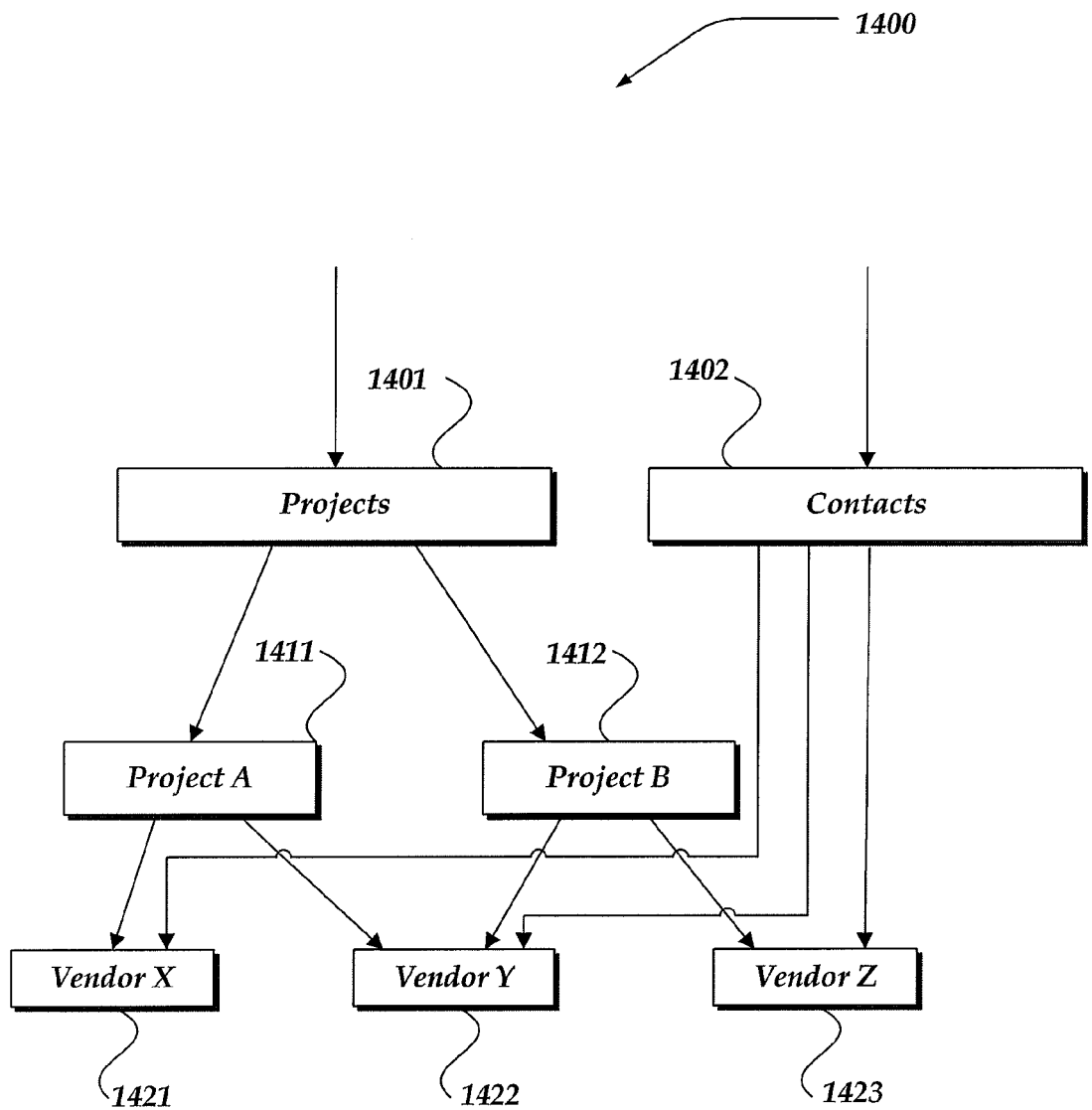
FIG. 14 illustrates one non-limiting example of an information item in more than one folder.

FIG. 14 illustrates one non-limiting, non-exhaustive example of a directed graph of a plurality of heterogeneous information items. Graph 1400 may include many more or less components than those shown. However, those shown in FIG. 14 are sufficient to disclose an illustrative embodiment.

As shown, graph 1400 includes information items 1401-1402, 1411-1412, and 1421-1423. Information items 1401 and 1411-1412 are shown as projects, while information item 1402 and 1421-1423 are shown as contacts. As can be seen, an information item may be in more than one folder. Thus, information item 1422 resides within both information items 1411 and 1412. Further, each of information items 1421-123 are not only within information item 1402, but information items 1421-1422 are within information item 1411, while information items 1422-1423 are also within information item 1412. Such interrelationships of heterogeneous information item types are directed towards illustrating a novel approach towards managing and organizing a user's information.

Figure 15:
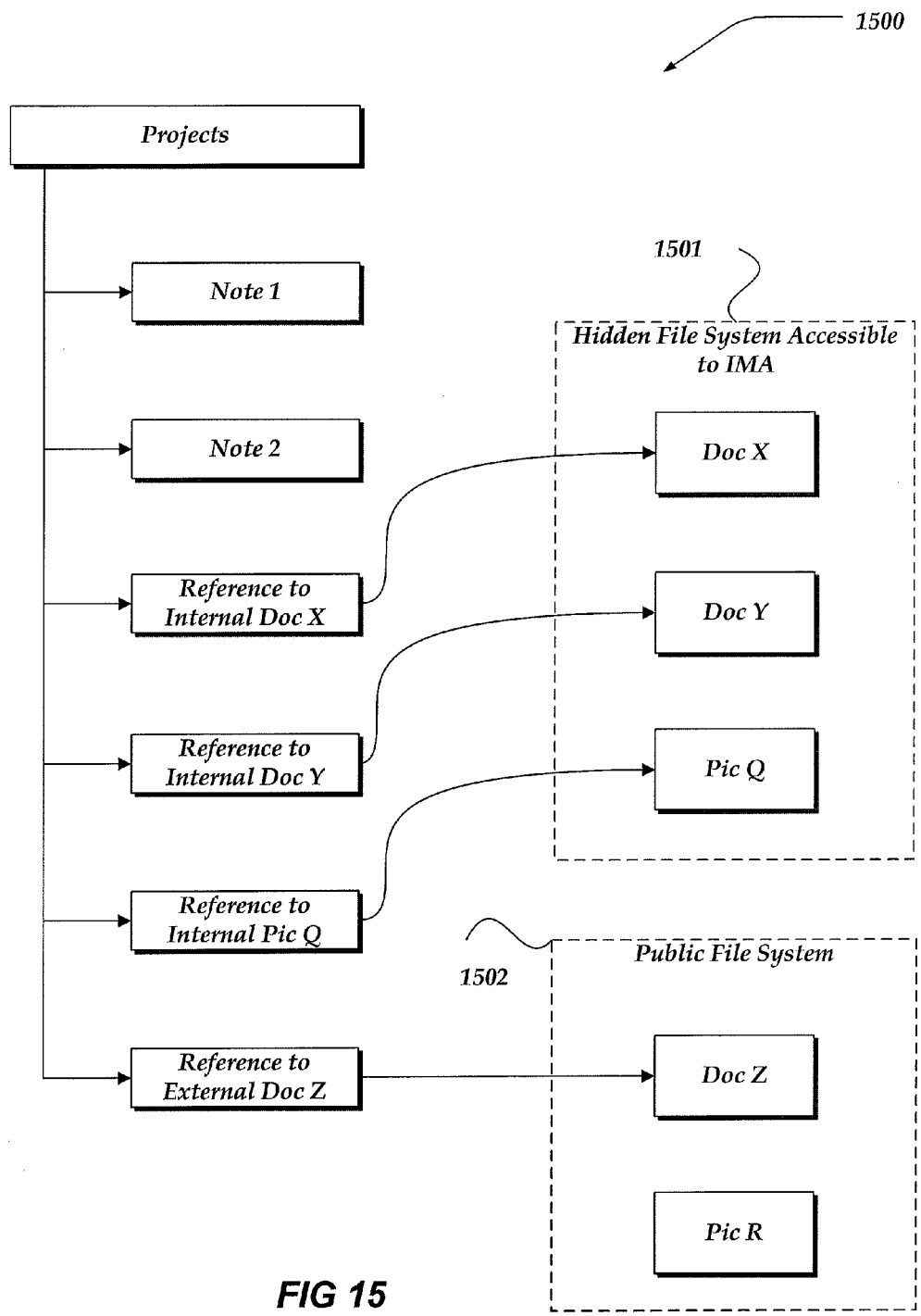
FIG. 15 illustrates as one non-limiting, non-exhaustive example information items that include files.

FIG. 15 illustrates in one embodiment, at least some information managed within the above structure may include files, such as documents, graphics, and the sort. Structure 1500 of FIG. 15 shows that some files may be marked as private or hidden. By identifying some files as hidden 1501 the files may, in some embodiments, be located within a private or restricted part of a user's file system that may restrict access to the files. However, other files may be designated as public 1502, allowing the files to be user-accessible through a variety of mechanisms. For example, in some embodiments, hidden 1501 files might be restricted to being accessible through IMA 222 of FIG. 2, and not a user's operating file system, while public 1502 files may be accessible through the user's operating file system.

Figure 16:
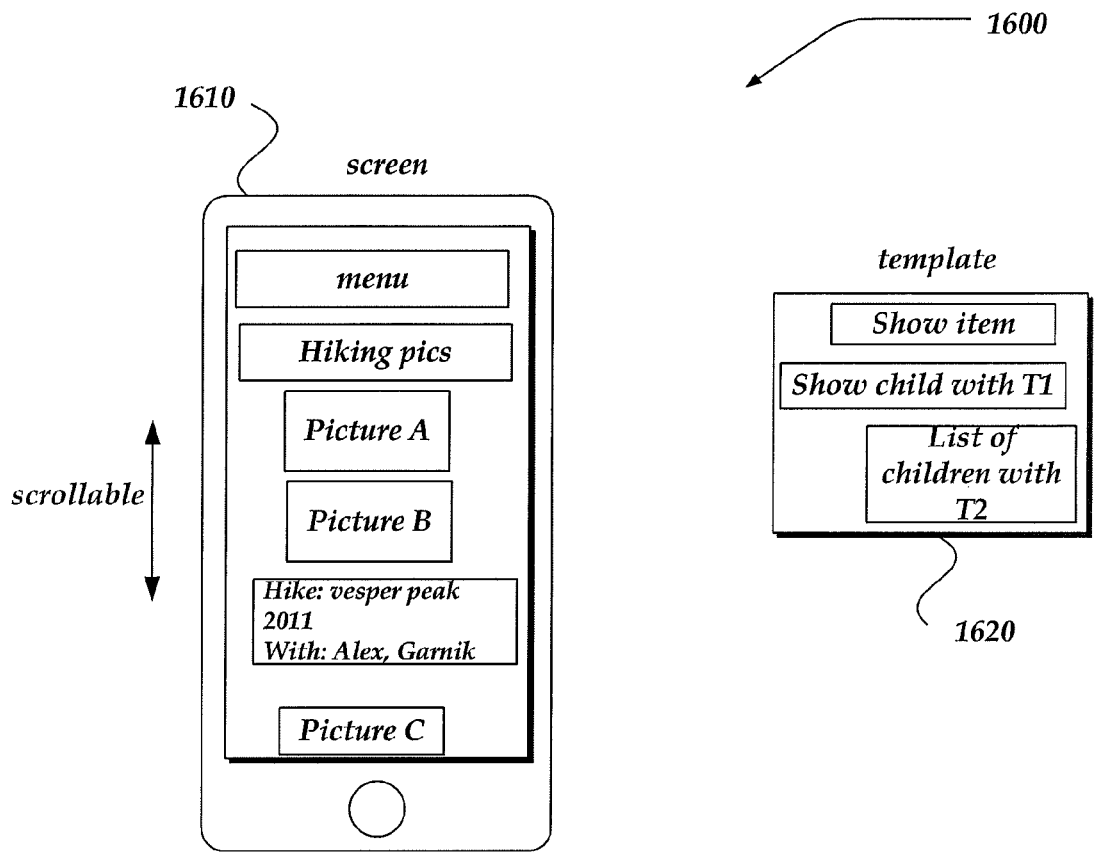
FIG. 16 illustrates one embodiment of a user-defined form and template that may be employed to customize an appearance of an information item and some of its children.
Figure 16:
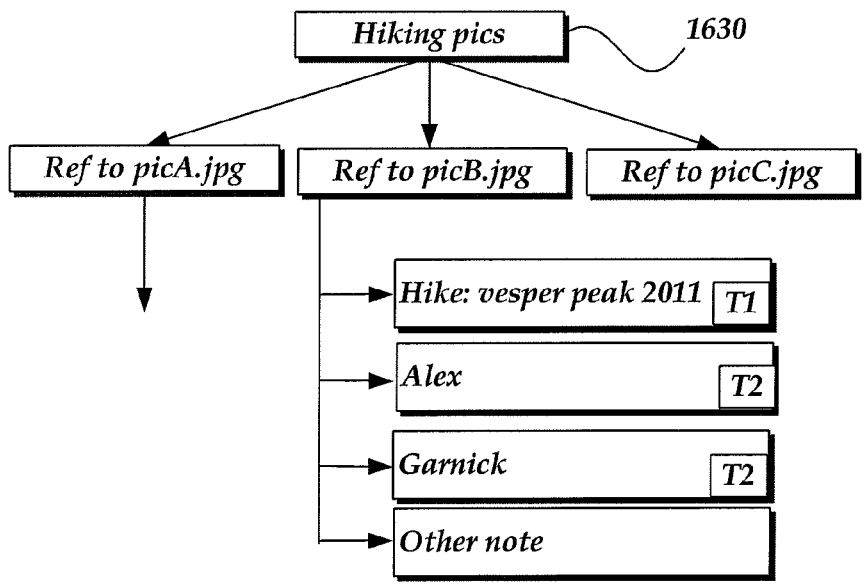

FIG. 16 illustrates one non-limiting example of user-defined form 1620 that may be employed to customize an appearance of one or more information items and optionally one or more of its children information items. In the form usage example 1600, form 1620 shows modifiable fields for displaying a primary node first, with a child node being tagged with tag T1. Also shown is that some fixed text may be used when illustrating one or more children tagged with tag T2. Screenshot 1610 illustrates a form defining a structured presentation of a display of graph structure 1630 having various information items.

Functional Specification for an Example Embodiment

The following sections further provide functional specifications for employing the IMA 222 of FIG. 2. As discussed above, a plurality of information items are implemented as nodes arranged within a directed graph (digraph) structure. In one embodiment, information items may be arranged hierarchically, starting with a root node. However any node can have multiple parents. Further, each node is reachable from a path within the directed graph starting at the root node.

In some embodiments, various specific node functionalities, such as calendar events, are implemented having restrictions on classes of nodes and providing specialized views.

Generally, node text can be directly edited. If restrictions are imposed, then a form may be used to control editing. Forms display and allow editing of data from the node and one level of child nodes. It may also reference and display various other nodes but no editing is allowed of such nodes. Moreover, in some embodiments, certain nodes may be pre-designated with special meanings. One of these is the Calendar node. Another is Contacts. In some embodiments, these information items may not be deleted, although they can be renamed. In other embodiments, these information items may be deleted.

Information Item/Node Types (aka Families) and Forms

In one embodiment, initially, any node created by the user is untyped in that it holds text and a few other general attributes, such as "user date". There are no editing restrictions on what text may be saved in the node. In other embodiments, some nodes have a predefined type, such as the Calendar node and calendar events.

A node can be assigned to a Family. Once given a type, the type typically does not change throughout the node's existence. Currently, any typed node may be edited using a form. The user may define any number of forms for a Family and can change, add, or remove forms at any time.

Displaying Nodes/Information Items

Nodes can be displayed in various ways besides a fully fleshed out digraph. A node can be displayed by itself, or it can be displayed with some or all of its siblings but no children, or it can be displayed with one level of parent, or one level of children, or the like.

Ordering

In some embodiments, all sibling nodes are ordered. In a general case, the ordering is user defined. Thus, for a given parent P, the children C1 through Cn are displayed in whatever order the user last arranged them. That is, the user can move nodes around and the resulting ordering will persist until the user moves them again.

Other types of ordering can be based on node attributes. For example, calendar events are ordered by event date and time. At the moment, these ordering mechanisms are hard coded.

Multiple Views

A node may simultaneously be displayed and edited in more than one view. In such cases, changes made to a node in one view will be reflected in other views as soon as the change is complete. Usually a change is complete when the user moves the system focus away from the edited text.

Calendar & Events

A calendar may include a Single Event and Recurring Event nodes. All events have a time of day and a text description. Single events appear on exactly one date in the calendar. Recurring events have a start date, an optional stop date, and can be designated to appear on one or more days of the week between the start and stop dates, or indefinitely if there's no stop date.

Each recurring event is represented by a Recurring Event node which gets displayed multiple times. The event node may have one child node, which can be any node from the rest of the digraph.

Tasks

Tasks appear bundled together under Due Group nodes. Each Due Group has a brief description and a date and time. Any node in the digraph can become a task node. It is intended that tasks under a particular Due Group are to be completed by that date and time. There can be any number of Due Groups.

A task node may have one of two states: incomplete or completed. A task can be cancelled simply by removing the node from its Due Group. A task can be moved to a different Due Group—e.g. it can be rescheduled.

One embodiment includes Due Template nodes which aid in creating Due Groups. A Due Template provides for creating Due Groups automatically, rather than one at a time. A Due Template includes a brief description, a time of day, and a day of week. When displayed, the Due Template has the same appearance as a Due Group. Thus, the user may add tasks to the Due Template in the same way. When the user adds a task to a DueTemplate, a Due Group instance is created; in some embodiments, tasks are not added to a DueTemplate.

Searching

The user can search on keywords starting from any node (or the root node) and following the digraph to its leaf nodes. Where loops exist in the digraph, marking nodes already visited may be employed to prevent infinite recursion. Also implemented is a special Contacts search where only the immediate children of contacts are inspected. Searching encompasses all types of nodes. So searching from the root could turn up results in calendar events, timesheets, or the like.

General Structure and Organization of an Example Embodiment

Path To Root

When displaying a node, an example implementation doesn't generally track the path from that node to the root. For other functionality, particularly context filtering, it may be desirable to know the path to the root, regardless of whether that path is displayed or not.

Effect on Implementation:
1. References to nodes, such as favorite buttons, store a path instead of just a node identifier (id).
2. Paths can change and the path-to-root then may become invalid.
3. One approach restricts context filtering such that the context node is an immediate parent of the context filter node.

Node Types (aka Families)

Every node may be assigned a family. If no family is assigned, the node is effectively untyped and its text may freely be changed without respect to the properties of any other nodes.

Once assigned a family, a form can be used to change the text. The form can directly bring in properties from child nodes, referenced via tags, and indirectly through nested forms allow editing nodes further in the digraph.

Creating Typed Child Nodes

Normally, when the user wishes to create a child node, the user interface (UI) may present a list of families to choose from, including a choice for an untyped child. A node will be created with the type (or untyped) based on the user's selection.

Alternatively, by adding one or more families to a parent node's "child families" set, new children may be restricted to be one of those types. In the UI, the context menu shows "Add [family name]" for each allowed family.

Predefined Nodes

Predefined nodes are used for the parent of contacts, calendar items, categories, and tags. Predefined nodes, in some embodiments, may not be deleted, though they can be renamed. Also they must remain a child of the root node.

Each predefined node has one family in the "child families" set which cannot be changed by the user in some embodiments. Thus users might then be restricted to creating children of that type.

In one embodiment, the predefined nodes include "Categories", "Tags", "Contacts", and "Calendar". Each of these has special functionality, described in detail in another section.

Actions that May be Performed on an Information Item (Node):

The following provides further descriptions of some of the actions that may be performed on information items, as briefly discussed above in conjunction with FIG. 3.

Add: Normally, a new child node goes at a tail of the children list. However, in other embodiments, a user may provide a preference to add at the head of the children list. Further, the user may provide an action to reverse the child order.

Further, adds may provide for a user preference for adding the child at a head or tail. Adds may further provide a UI that enables reversing a children's order.

Move: Some embodiments allow moving child nodes from one parent to another; and/or adding to another parent without removing from prior parent node. If a parent node specifies "child families", some embodiments may prevent moving a child to that parent unless its type is in "child families".

Link: Link actions may operate similar to "move" action. A difference between the two actions may include that a new parent-child link is created and the child gains a new parent. In some embodiments, a similar restriction may be employed as for "move", regarding "child families" of the new parent.

Delete: The delete action deletes a parent-child link. If the child is linked to only one parent, the child may be moved to an "orphans" node. When viewing a child node of "orphans", a "delete" action may be used to delete the node and its children. Any children that have links coming from outside the "orphan" diagraph will not be deleted.

In some embodiments, delete action may operate differently when two parent nodes have relationship to a common child node. An example of such relationships may be seen in FIG. 14, in conjunction with information items 1411-1412 and a common child node, item 1422. Other examples are also shown in FIG. 14.

In such situations, when the relationships between the common child information item and both of the parent nodes are cut, removed, or otherwise deleted, an alert may be provided indicating that the child has no parent relationships within the directed graph structure.

Similarly, when one parent node having a relationship to the common child information item is cut, removed or otherwise deleted, a request may be provided that seeks what action, if any, to apply to the common child information item, including deleting the common child, or retaining the common child within the directed graph structure.

Cut: Given a selection, "Cut" works like delete. Thus, cut may result in semantic problems of whether a node is deleted versus simply removing its current parent link, leaving links to other parents intact. As with removing the last parent link, described in elsewhere, anything cut may end up under the "orphans" node.

Copy: Copy" may include two forms. One form is what goes in the general clipboard—or really, what can be extracted to other applications from the clipboard. This may be plain text or rich text. The other form is what can be pasted back. In this case, the node structure and its properties persist and are available to paste into another location, meaning the parent of the selection will gain a link to its new parent.

Paste: Paste is based on the source. First let's take the source as where the selection is from a single set of siblings. In this case, the siblings will be considered contiguous in their new location (even if they weren't in the old location) and may be inserted among the new siblings in their original order. The second case is a selection sourced where it spans levels. In this case, the selection may be inserted at the point specified and keep its original form. In a third case, pasting may be from an external application's selection. In this instance, pasting may be performed within the text of a control, such as a node's value, or the like.

Drag and Drop: Drag and drop may have the same semantics as "cut" and "paste". However, cut/copy and past may be implemented using a clip board, while drag and drop need not employ a clip board. Further, drag and drops may be performed within a same folder or across folders, using similar actions.

Undo: Every change may be recorded with a triple added to a queue. In this action, actions in a queue may be applied in reverse order. When a synchronization has happened to some of the nodes, then the system can apply reverse order changes backwards to the synchronization point. After that (or if all changes have been synched) then the changes are applied and re-added to the synchronization queue.

Multiple Selections

There are two forms of multiple selections. The simpler one is among siblings where the selection doesn't include any parents or any children. The selections can be disjoint and may include all highlighted nodes within the set of siblings.

The other form of multiple selections spans "levels" in the digraph, meaning that it can include a parent, and children, and grandchildren, and so on. In this instance the selection is contiguous and selects either no or all children of any particular node. For example if the selection is rooted with parent P, and includes child C1, it also includes children C2 . . . Cn where there are n children of P. It can include grandchildren of C1 and, if so, then it includes all of them. But, just because grandchildren of C1 are included does not mean the selection needs to include grandchildren of any other Ci.

External Objects (Besides Email & Contacts)

IMA may allow external objects, such as files created by other programs, to be represented by nodes in the digraph. For example, the user may include an Excel spreadsheet, a CAD drawing, a PDF from someone else mixed in among other nodes. Several ways may be employed to perform such actions. In one approach, a file on the user's computer can be dragged into the digraph, and a reference to the file will be stored as a node. In another approach, the user can create a reference node in the digraph, and specify a program (or file type).

In the first case, the user may risk having dangling links if he moves the file. That is, IMA may not know to fix the reference to the file when the user moves the file. In the second case, IMA may determine where in the user's computer file system to store the file. A reference to it will be stored in the database. There are some advantages to the second approach, including no easily broken references; synchronization can be managed by IMA so that referenced files can be up-to-date on all computers using the same database; and the user doesn't have to maintain two systems—the IMA digraph and the computer's file system.

IMA may incorporate external file revision control. IMA may make snapshot of external files by creating a new node X with a snapshot of each file as a child of X.

Categories

Categories are an organizational aid for the user and are useful to indicate that some node A is assigned to category B. A category is a node designated as a category. A node A that is a child of category B is a member of B. A node can be a member of multiple categories and a category can have any number of members (e.g. child nodes).

For convenience of managing categories, all category nodes (those designated as a category) may appear under the "Categories" node. Thus, when the user designates a category, that node will be added under "Categories". Likewise, if the user un-designates a category, the node will be removed from that "Categories".

A predefined node "Categories" roots all category nodes. Whenever a node is designated as a category, it gets automatically added under "Categories". Alternatively, adding a node under "Categories" automatically designates it as a category. When a node A is designated as a category, if its path-to-root contains a category B, then A becomes the child of B instead of a direct child of "Categories".

"Categories" may be displayed as sub-graph within the network. Any children of a category that are not categories themselves will not appear in the "Category" sub-graph view. For example, a category A may have children B, C, D, where B is also categories; only B will appear as a child of A in the "Category" view, and C, D are just members of A. The user may reorganize the nodes under "Categories".

A node can be undesignated as a category, but only if it has no child categories; if so, they need to be either undesignated or moved elsewhere first.

Finally, a "Categories" view may be useful when assigning a new node to a category. The UI will provide a popup (or pane, or the like) view of the "Categories" and the user can browse it to select the categories for the new node. The following provides one non-limiting, non-exhaustive example using "Categories" views.

The following subgraph, includes categories shown with (c)
  Contractors (c)
  Framing (c)
    Ace Framing (member of Framing)
    Bill's Builders (member of Framing)
  Electrical (c)
    Current Electric (member of Electrical)
  Plumbing (c)
    Down is for Drains (member of Plumbing)
    Easy's Plumbing (member of Plumbing)
The example includes having the following project somewhere else in the digraph
  Beach House
    Ace Framing (member of Framing)
    note 1
    note 2
    Current Electric (member of Electrical)
    note 3
    note 4
    Easy's Plumbing (member of Plumbing)
    note 5
    note 6
Then, "Categories" graph view would be:
  Categories
    Contractors
      Framing
      Electrical
      Plumbing Tags Tags may be used for identifying child nodes to display in a form as well as nodes that interface with external services, such as contacts. When a node A is tagged, it may be edited via a form and its value will appear in the form field identified by A's tag. When the form values are saved, tagged nodes are updated, or created if they do not exist.

To tag a node, a tag is first created. Tags are nodes themselves, typed as family "Tag". Tag nodes may not have any child nodes. The form builder provides a UI for creating and managing tags. Also, a similar UI may be available from the top level of IMA.

A predefined node "Tags" roots all tag nodes. Whenever a tag node is created, it is automatically added under "Tags". Since tag nodes do not have child nodes, the contents under "Tags" are a flat list. It may be ordered alphabetically by tag description.

The user can also create new tag nodes by adding children under "Tags". And the user can edit the description. Further, there can be multiple child nodes with the same tag; in such cases, the child nodes can be displayed in a list in the form (so that more than one of them will be visible).

Form Behavior

A Form provides structure when editing a node and some or all of its child nodes. A form is composed of fields; the "primary" field is the value of the node N being edited. The rest of the fields correspond to child nodes of N and are referenced by tags (see the "Tags" section).

A form can be used on a node N and its tagged children when N has been assigned a family That is, when the user attempts to edit a node having an assigned family, the associated form will automatically open. Tagged children will not display except in a form, in some embodiments.

A form field can be a list, in which case in which case there are zero or more child nodes with the associated tag. If there is more than one child with the same tag, and the associated form field is not a list, just the first child will display.

Another special case is when a tagged child node C has an assigned family. In this case, the child node is edited with a form. Then, a placeholder for C will appear in the parent form, and the user opens C's form to edit C. This approach is provided whether the field represents a single child node or a list.

Alternatively, a tagged child node can be represented with an embedded nested form so that the nested form is seamlessly part of the parent form.

When displaying a node N having an assigned family, it may be desirable to display some of N's child values along with N's value. For example, to display a contact, one may want to display the name, email address, and phone. To do this, the user defines a display-only form. It is invoked whenever the node is displayed in the network view or other view.

The syntax of a field's value can be verified and assured by associating a field validator with the field. In one embodiment, each field validator is C++ function referenced by a validator identifier. Other implementations may also be used. One embodiment provides an interface for 3rd parties to provide custom validators.

Examples of validators include, but are not limited to:
Strip pre & post blanks
Integer
Date A second type of validation is cross-check. The cross-checks are associated with the form, not individual fields. They are meant to ensure that the value of one field is compatible with another.

Forms may be non-modal. That is, the user may be able to have as many forms open as desired and freely switch among them or anywhere else. In this situation, field values in a form are updated as soon as they change in some other view.

The following provides non-limiting examples of the use of forms.
example 1: subcontractor on site
  who
  which site (may not be needed if this form is used under the subject project)
  start time
  stop time
  brief description of work done
  brief description of issues
example 2: confirmation
  brief description
  list of links to does
  who confirmed
  select from contacts list
  date confirmed Defining Forms For every family, the user may define any number of forms. No forms are required, but if none exist, the user may not be able to edit the associated node. If there is more than one form, the user may use any of them. When using a form, a dropdown list as one embodiment allows the user to switch to a different one. This is useful if showing all the fields becomes too cumbersome; it may be nicer to show a subset at a time in various forms.

Additionally, one special display-only form can be defined. This form will be used when a node is merely displayed, rather than being edited. It simply displays the fields as flowing text.

The UI for defining "child families" for a node also provides a UI to build forms. In the form builder, the user can position and size fields, set a field type, associate a tag with a field.

The form builder also has a UI for selecting and creating tags.

Sorting

Children may be displayed in the order that the user places them. However, the user can rearrange the order, and the new order is preserved. Some lists of children are sorted. For example, calendar events are sorted by event date. Tags and Contacts are ordered alphabetically. One embodiment provides a user-defined field to sort on.

Viewing a Long List

There may be several ways to view long lists of child nodes. One is displaying a contiguous subset of the list. Another is to display children that match some search arguments.

For the subset approach, initially the trailing x nodes may display, where x is a user settable number (possibly an attribute of the parent node). If the user has set preferences to display new nodes at the head of the list, then the initial display will be the leading x nodes.

At the top and bottom of the subset may be "less" and "more" buttons. Clicking "less" may hide x nodes from that end of the segment; clicking "more" may show x more nodes at that end of the segment. Other mechanisms may also be used.

Another approach is showing child nodes that match search arguments (args). A search args box and search button will appear under the selected node where the user can enter search args.

When the user executes the search, the matching results may appear as children below. Any prior search results are hidden first. The selected child will have "less" and "more" buttons above and below and allow showing an expanded subset, as described for the subset approach.

Still another approach is to show all children via a corresponding UI element (e.g., button). In each of the above cased, tagged child nodes may always be hidden for some embodiments.

Searching

One embodiment inspects all child nodes reachable from the selected node. The selected node can be the root. Further, the description of each node may be compared against one or more strings of text using a caseless comparison. The comparisons can overlap; i.e. the patterns "on tone" both match "stone".

Some embodiments provide a keyword match—keyword(s) can be associated with a node and explicitly be compared; this could be like categories. Some embodiments highlight text that matches search args.

Context Filtering

Categories provide a way to associate a node with various groups, such as categories. However, consider the following example, where one uses a particular vendor V (or service or . . . ) for several projects (or clients, et cetera). During the course of work, it may be desirable to record notes as child nodes of the vendor. But, it may be desired to keep them separate so that notes related to project X do not intermingle with notes for project Y. Since the same vendor is used for project X and Y, though, the notes may have a single parent: vendor V. So, all notes will appear intermingled under V.

One approach could partition the notes by making projects X and Y categories and making the respective notes members of those categories. Then one could choose to display all member of category X and get V's notes just for X. While this approach works, it might involve too much work to do that for every note recorded. Plus, notes from other vendors used on X or Y would be intermingled with notes from V.

Context filtering is a solution for this purpose. In the following example, there are two projects which are category nodes—indicated with (c). Under those project nodes are subcontractors and under subcontractors are notes. The subcontractors are flagged as category-filter nodes—indicated with (f). This means that nodes added under a filter node automatically become context members of the category above the filter node and only such nodes will be displayed.

Projects
        Beach House (c)
            Ace Framing (f)
                note 1B
                note 2B
        Chelsea Apartments (c)
            Ace Framing (f)
                note 1C
                note 2C
    Contractors
        Ace Framing (f)
            note 1B
            note 2B
            note 1C
            note 2C As seen in the above, Ace Framing is in three places. At the bottom, under Framers, is shown all the children of Ace Framing. In the other two locations, one can filter the children by the project (Beach House or Chelsea Apartments), so that only the children relevant to the project are shown.

As used herein, Category refers to a node which defines a category. For example, if want a category for marking who is an electrician, then could create a category node "Electricians". Then one might mark "Current Electric" as a member of "Electricians". A context-filter refers to a node F whose children are filtered by a specified category. It doesn't matter if F is a category node or not. However, for filtering to occur, it should be a child of a category node. Otherwise, the filter might have no effect. A context-category refers to a category to use with a context-filter node. Further, a context-member refers to a node which is directly under a context-filter node and belongs to the currently displayed context-category.

Filtering

Whenever a context-filter node F is encountered, one can identify the context-category P, if any. Among the children of F, those which are a context-member of P can be displayed. If P doesn't exist, all children of F are displayed. When creating a new child of F (as described above), the new child may become a context-member of P.

Determining a Context-Category

The context-category for a context-filter node F is based on the displayed parent P of F. If the parent is a category node, then the context-category is P. Otherwise there is no context-category.

If the context-filter node F has no displayed parent (e.g., it is the displayed root), then the user may specify the context-category. The user can select "none", meaning that all children may be displayed.

When opening a view via a favorites button, in one embodiment, the user may use the context-category saved with the button, if any. The user may perform similar actions for opening a view for an activity (task or event).

When creating a favorite button or activity, the user may save the context-category with the button or activity.

In some embodiments, a UI is provided to temporarily display all child nodes, regardless of context. Further, a UI may be provided to show the set of context-categories used for the child nodes and let the user temporarily select a context-category.

Favorite Buttons

"Favorite" buttons refer to shortcuts to immediately display a subgraph rooted with a node associated with the button. For example, one could have a button labeled "projects" which immediately opens a graphic view rooted at a projects node. The user may also create a favorite button by dragging a node to the UI favorites bar. In some embodiments, the user may be allowed to user dropdown favorite buttons so that more favorites can be packed in a smaller space.

In another embodiment, (called "rapid navigation") is to have context sensitive favorite buttons. With this, a certain set of buttons would always be displayed. A second set of buttons would depend on what node is highlighted in the sub-graph view.

Calendar

Activities, Events, and Tasks

A calendar is headed by the predefined "Calendar" node. It contains two children: "single events list" and "recurring events list". The single events list children that are all the activities which occur just one place on the calendar. The recurring events list contains activities which get replicated between a start date and an optional stop date per a frequency defined by properties.

In some embodiments, this may be a single user system; however, tasks can be assigned to other users. In some embodiments one can provide via notifications and email, that other users can update task status. Notifications describe more actions.

Events are activities which have a specific time, e.g. a meeting. Tasks are activities which do not have a time; only a date. Activities may have the following properties:

a short description
        a start date and time (e.g. for a meeting), or
    a start date and priority (e.g. for a task: go to post office)
        a sequence number (hidden, but useful for a third level of ordering)
    an optional stop date and frequency
        a status
        an optional duration
    optional place
        optional contact list—e.g. a meeting
    optional owner—null implies self
    custom color coding, highlighting, fonts, font style,
    Frequency can be one of the following:
    days of week (e.g. every Tuesday)
    date in month (e.g. 1st of every month)
    day in month (e.g. every first Thursday of month)
    every x weeks
    every x days
    Priorities may include:
    none, bottom, low, mid, high, top
    possibly other user defined priorities
    Status may include:
    tentative, incomplete, completed indicator
    allow deleting (i.e. cancelling) a task Some embodiments incorporate a "sticky note" metaphor. It should be noted that implementations are not restricted to the above examples, and others are also considered.

An activity node is sufficient by itself to define an activity. However, it can a link to one child from anywhere in the digraph. The user can "view in graph" the activity, which opens a graph view rooted at the activity's child.

A task or event can be created based on some trigger. For example, client just signed; must ship product in 24 hours.

Some embodiments automatically create tasks when waiting for a reply to email, phone, or the like.

Notifications

A notification is an alert, such as a beep, a text message, or a popup, that an event is about to happen. When the user creates an event or at a later time, an option may be provided to specify a notification. If the event has a contact list, notifications can be emailed to all contacts. Some embodiments interface with other scheduling systems to provide notifications, too.

When specifying a notification, the user provides a value that represents the amount of time in advance of the event when the notification should occur. For example, the user may specify 1 hour, meaning that the notification will occur 1 hour before the event's scheduled time. At any time after the notification occurs, the user can rearm it.

Moreover, some embodiments provide a special notification that contains a summary of all tasks and events for the day, such as Scheduled to occur daily at a predefined time.

When the task has a non-self owner, notification can be sent to the owner contact for the conditions described above. Some embodiments provide such notifications via email, MS Scheduler, or the like.

Projects and Reminders

Projects are a collection of activities which can be, but do not have to be, interdependent. The collection is rooted in a single activity node, referred to as the project node. The collection can be a flat list of child nodes of a project node or it can be hierarchical. The interdependencies are specified separately from the organization of the activities. A more detailed description of projects is in the project & Gantt charts section below.

A project's duration is based on the duration of its activities. Its start date is the date specified in the project node and its end date is the start date+duration.

A reminder is an activity that serves to remind you to prepare for an activity occurring later on. For example, you might need to write a brief white paper to prepare for a meeting next week. This may be done by creating simple projects. The project represents the main activity (e.g. the meeting) and the child activity represents the reminder (e.g. write the white paper).

Event Views

Events are the main focus of the calendar views. In some calendar views, tasks will display with events; in other calendar views tasks have their own view.

In all views, the user may directly create an event. In this case, the user may enter the event description and, optionally, other properties. The user may also drag a sub-graph view node into the view to create an event. This will create an event node with a child link to the graph view node. The description will default to a concatenation of the sub-graph view node's parent description and its description. The user can change it to something shorter if desired.

For those views with time units, the time and duration can be set by positioning and sizing the event. In other cases, the user may enter the time and duration along with the description. Other properties, such as recurring frequency, stop date, contact list need to be edited through a small form. Double clicking an event may open the form.

The current day may be highlighted. Weekends may have a different color from weekdays. Recurring events may have a different color from single events.

When a project becomes an event (i.e. it has a specific start time), only the project root may be shown in calendar views. Nested activities of the project may be shown in the Project View or in the sub-graph view rooted at the project or the project's Gantt view.

A dropdown or other mechanism may provide choices for switching between views. Whatever event is highlighted will be highlighted in the new view and will be visible (i.e. not scrolled out of view).

Event List View

This view is simply a vertical list in chronological order of all single events starting with the current view, and scrollable in both directions. Recurring events are not shown in this view. It provides a very compact way to view events scheduled way into the future, unless there are many of them (not likely).

It is divided by "day" separators. Separators are not shown for days with no events. No tasks are shown.

Event Grid View

The grid view includes recurring events. It has one row per day and one column per event. Within a row, the events are arranged by time. For each row, a context menu item may allow opening a small window showing tasks assigned to that day. No tasks are shown in one embodiment. The vertical scroll bar provides a way to view other days. The horizontal scroll bar shows scrolls through events for the day.

Event Month View

This view might provide seven days across and enough rows to show all weeks in the month. The space may be divided into uniform rectangles for each day.

Similar to Grid View, only events might show. They will be ordered by time of day. The user may open a separate window to see tasks for the day. In some embodiments, when events do not fit in the day rectangle, the containing rectangle is expanded vertically.

The vertical scroll bar provides a way to view other months; the horizontal scroll bar may be used to allow more width than the window allows.

Event Week View

This is similar to the month view except one week is shown. Since there is more vertical space, the rectangles are subdivided into hours and events are positioned according to their start time and have a size depending on their duration. No tasks are shown in some embodiments.

The vertical scroll bar provides a way to view other weeks; the horizontal scroll bar may be used to allow more width than the window allows.

Task Views

In some embodiments, none of the event views described above directly includes tasks. There are several ways to view tasks discussed below, including, using a popup showing a single day's tasks; a dockable task panel embedded in the calendar view; or the project view.

Task Popup View

This includes a small non-modal window showing tasks assigned to the corresponding day. If the user has more than one of these popups open, tasks can be dragged from one view to another. Alternatively, the user can edit the properties to change the date or even convert tasks to events by specifying a time.

Task Dockable Panel

Unless showing the Project View, the calendar window allows a task pane to be dockable on any of the four sides. The main part of the calendar window shows the currently selected event view.

In the task pane, tasks may be ordered by day and then by priority. Indicators may show which tasks are completed or what the priority is. The user may drag tasks around to change the day or the priority. Alternatively, the properties can be edited.

Project View

This view combines tasks, projects, and events so that all can be viewed together on a day by day basis. The view is divided into major rows, one per day, and minor rows per activity (task or event). Each major row is sized to hold the tallest collection of minor rows. Horizontally, the view is divided into columns, one for all non-project tasks, one for each expanded project (more on that in a moment), and one for all events.

Normally, projects may show up in the task column or, if they have a specific time, as an event in the event column. The project root will be displayed and if the user wants to see more detail, the user opens up a sub-graph view or Gantt view for the project.

By expanding a project to show in its own column, one can view tasks or events of the project. For each day, tasks or events that occur, or at least partly occur, in that day will be shown. Each will be shown in a minor row, as described above. Ordering will be by dependency, if defined, otherwise in chronological order for events and in graph view order for tasks. Any task or event can be moved to a project column. Some embodiments allow the user to move columns around, e.g. show tasks on the right. Maybe rotate orientation.

The following provides one non-limiting example:
Example: construction tasks active today
major division: project;
minor division: tasks occurring today Example: attorney with multiple clients
major division: client;
minor division: all tasks (dependencies not setup)

Activity Property Forms
Include at least the following:
single event form
short description
date, time, duration, place, contact list, notes subgraph
actual duration
recurring event form
short description
start date, start time, duration, occurrences, stop date, place, contact list, notes subgraph
single task form
short description
todo date, duration, notes subgraph
actual duration
recurring task form
short description
todo date, duration, occurrences, stop date, notes subgraph Contacts & Email One embodiment provides email functionality by interacting and collaborating with 3rd party systems. Contacts, on the other hand, are fully present in IMA. However, since 3rd party email and other systems may want contacts, some embodiments provide a way to keep them automatically synchronized.

Contacts

As noted elsewhere, contacts are stored as nodes, just like almost everything else. A predefined node "Contacts" roots all contact nodes. Whenever a user creates a contact—anywhere in the digraph—it will be added as a child of "Contacts". Contacts can be directly added too. A contact can also be a child of another contact; it will also automatically be added directly under "Contacts". In some embodiments just contact-family nodes can be added under "Contacts", but any kind of node can be added under a contact.

Since there likely will be many contacts, it may be desirable to search for a contact rather than scroll through the whole list. This is described in more detail in another section, Viewing a Long List.

Somewhere near the favorite buttons may be a search-contacts button to open a small window with contacts matching search args. This may allow the user to quickly navigate to a contact when working in some other area of the digraph.

A contact can be linked to other contact nodes, giving a parent-child relation among contacts. If a top-level contact (meaning a direct child of "contacts") is removed from under "contacts", it may remain a contact-family node but no longer be synched with any external systems. Further, in some embodiments, it may not be searchable under "contacts".

Contact data may be highly structured to provide for synchronization with 3rd party systems, though it's also useful for viewing it in different ways (see Form Behavior). Since contacts are typed (have an assigned family) a display-only form may display a short one line version of the contact and all tagged fields may be hidden in the sub-graph view. The user can modify or create additional forms and add special purpose tagged fields if desired.

Some embodiments provide two-level contact forms for businesses. One part may be the business, with info common to all employees. The other would be contact-specific information.

Some embodiments provide a copy function for contacts. If there are two employees at the same location, one might start by copying from the first to create the second.

Email

While one embodiment of IMA does not implement a full-blown email client, it may still incorporate some aspects, such as: links to external messages, the ability to compose a message and send it; similarly to automatically create a notification message and send it; and show the inbox and open messages.

In some embodiments, messages may be represented by a node, similar to representing external objects. In other embodiments, messages are an information item and hence a node operating as a folder. The node's description may default to the message's subject, but can be changed by the user. The reference may be a UID, unique within the email service being referenced. This presumes that the email service has such UIDs.

Typical embodiments provide a UI to open the email message referenced by a node. Some embodiments automatically link emails to contact node. Certain contacts could be flagged to automatically create child nodes for each email message received from that contact.

When viewing the inbox or a message, the user may drag a message into the sub-graph view, creating a link to the message. With a context menu selection, the user can also create a task, with a link to the message, indicating work to be done. Also, the user can assign a category, just as with any node. Some embodiments allow a user to associate a message with a contact under a particular context.

Some embodiments show tasks associated with contact so that a task can be marked complete or propagated, or the like. Some embodiments incorporate this into the message view along with check boxes for marking complete, need reply.

When composing an email within IMA, it can automatically create a task node that indicates a response is expected.

Notifications can be sent to a contact in advance of some event or task. The user can provide a template message with tags for fields to be filled in from the contact node. See Notifications and Tags. Further, some embodiments are configured to show email sent by a particular contact.

Projects & Gantt Charts
Projects

A project is a collection of activity nodes, with optional interdependencies in the form of a Gantt chart. A project can start out as a just a hierarchy of nodes. Later those nodes can be formed into a Gantt chart, and finally added to the calendar if desired.

There are several orthogonal domains of organization in a project. The first may be the parent-child structure of the digraph. The other is the set of links forming the Gantt chart. The Gantt links need not be related to the digraph links, in some embodiments.

Graph View Project

The first step of creating a project can be creating an untyped node and labeling it with the project name. Each task one envisions for the project can be created as an untyped child node. Another approach would be to mark the project node as a context node. Now, existing contacts can be added under each (still untyped) task node and any future notes added under the contacts will assume this project's context.

Gantt View Project

To proceed, on builds a Gantt chart. The Gantt view shows a project and all its tasks and interdependencies. One may create a new Gantt view using the project node's context menu. An activity node is created for the project with a single link to the project node.

To create the interdependencies, one may drag (or otherwise designate) nodes into the Gantt view. For every node dragged in, IMA will create an activity node with a link to the dragged-in node. The activity nodes will contain the dependency links, leaving the structure of the original nodes alone (except for the parent link to the activity node).

The following provides one embodiment of actions for dragging from the graph view to the Gantt view. In this example, everything gets linked sequentially (nothing in parallel) by default:

- Source nodes can reside anywhere in the digraph, but exist in one place in the Gantt view.
- Nodes dragged individually (single node selected) will become direct dependents, in parallel, of the project node.
- Dragging a node A and dropping it on top of a Gantt-view task B makes A dependent on B and breaks in existing antecedent links of A.
- Same as above, but holding during the drag preserves existing antecedent links of A.
- Sibling nodes selected and dragged as a block will become linked in sequence and the group will be dependent on the node it's dropped on, or are dependent of the project node.
- A parent node N and all its children selected together and dragged as a block will become linked in sequence and dependent on N, i.e. preorder graph traversal.
- Within the Gantt view, the following actions are available:
- Right click in the Gantt view to add a new task.
- Dependency links can be removed.
- Tasks can be edited similarly as in the calendar views.
- The duration can be of any available unit, but all nodes in the Gantt chart must have the same units.
- Nodes with zero duration will show up as milestones.

Note that the nodes do not disappear from the graph view when dragged to the Gantt view. Both organizations of nodes persist and in both places the user can add notes (or any kind of node) as children of task nodes.

Since Gantt nodes are activity nodes, they have properties for marking complete, contacts to notify and so on, as described in Activities. This includes notification to others, if setup, ahead of time that their task will become active—that is, its antecedents are about to be complete, and a 2nd notification when it actually becomes active.

To know that an activity has actually been finished, users may send confirmations or directly update the activity. The following provides one non-limiting example.

Project A
    prelim
    phase I
    task A
    task B
    phase II
    task C
    task D
    task E
    celebration The following provides a non-limiting example of steps:

1. create Gantt view for "project A"
2. Select the whole subgraph, prelim through celebration, and drop it in the Gantt view. This results in the sequence:
project A>prelim>phase I>task A>task B>phase II>task C>task D>task E>celebration.
3. Now, let's say task C and D can be done in parallel. Drag D and drop on "phase II"; this will break the link from C to D and make one from "phase I" to D:
project A>prelim>phase I>task A>task B>phase II>task C (no dependents)>task D>task E>celebration.
4. Assuming we want E to depend on both C and D, Drag E with pressed and drop on C. This preserves the link from D to E and adds C to E:
project A>prelim>phase I>task A>task B>phase II>task C>task E>celebration.>task D>
5. Let's make "phase I" and "phase II" act like headers and span all their child tasks. Make "phase II" dependent on "phase I" and make "celebration" dependent on "phase II":

--- project A > prelim > phase I . . . > phase II . . . > celebration.
> task A > task B > task C > task E >
              > task D >

---

Dates and Durations

In some embodiments, the Gantt chart has no start date or durations unless the user enters them. Once durations are provided, IMA can compute relative start times for each task. If a start date is provided for the project node, then actual dates (and times, if a start time is provided) are computed for each task. Another way to assign a start date is to drag the project node to the calendar. If it is placed in an event view, it receives a start time; if a task view, it receives a start date. Once part of the calendar, the project's tasks can be seen in the Project View.

The computed start dates of any task can be overridden by editing the task and providing a specific start date. If so, dependent task start dates will be recomputed. Another way to override the computed start date of a task is to drag it into a calendar view. It then becomes a calendar event or task.

Gantt View Appearance

The Gantt view may be arranged with dates along the x axis and tasks along y. By default, each task may be in its own row, but the view can be compressed to put them in as few rows as possible. Each task may be represented by a bar, its length spanning from its start date to its stop date (or whatever units are used). If no start date is specified for the project, days (or whatever units) will be labeled day 1, day 2, and so on. A task with zero duration will appear as a milestone, sometimes called a deadline, with its own symbol. In some embodiments, the critical path may be shown in a different color.

Project Templates

An existing project can be used as a template to start a new project. This will make a copy of the Gantt activity nodes and their interdependencies. It will also make copies of the directly linked project nodes. Some embodiments have an indicator to show which nodes are shared and let the user decide which to copy and which to remain links Having shared nodes is desirable; e.g. project involves working with vendor X; probably do not want two copies of vendor X. Alternatively, one may create a project template by copying category nodes.

Other Features

Third Party Forms, Form Letters

Since IMA may include contact information with possible user-defined extra fields, such information may be used to fill out 3rd party forms. Similarly, one might want to do a mass mailing (or emailing) and fill in contact-specific fields. The tag ids used in contacts (and any IMA typed object) may be the medium for relating a 3rd party form field to a IMA value Time Tracking Time tracking entails keeping a log of hours (or other units) spent on various tasks throughout the day (or other period of time). And then, being able to organize the logs by client or other property and ultimately export them to a financial system. It may be easier to log time, or add time to a task, if it was revisited during the period, and easier to add notes, review, or the like.

A Simple Approach

One simple way is to create a node called Timelogs and each child would be a timelog for the desired period. Each log would have a list of tasks as children, each with some properties, such as project, hours, and notes. For example:

Timelogs
        Day 1
        Client A—2 hr—started proposal
        Client B—1 hr—discussion
        Client C—4 hr—working on phase I
        Day 2
        Client A—1 hr—finished proposal
        Client C—6 hr—working on phase I
        Day 3
        . . .

Form Approach

Because the simple approach's data may not be structured, it may mean that by-hand intervention to migrate it to a billing system is employed. By adding a form for a timelog, it's easy to keep the data structures:

top level: listbox of subforms, each subform a task—task level: embedded nested form with task name, contact, hours, note.

With tasks shown in a list, the user can add new tasks (i.e. new rows) as needed. The data is structured and identified with tags. This is directed towards providing a straightforward to convert to a format acceptable for import to financial software, with a resulting a subgraph something like:

Timelogs
        Day 1
        task A (displays as Client A)
        Client A
        2 (displays as 2 hr)
        started proposal
        task B
        . . .
        task C
        . . .
        Day 2
        . . .

Template Approach

This approach provides a UI command to create a template from an existing timelog and to create a new timelog from a template. The template may have links to all the tasks to be included in a timelog but no actual data; that is, the tagged fields representing hours, note, and any other data may be missing. Using the prior example, the template would be:

Timelogs
        Day 1
        task A (displays as Client A)
        Client A
        task B
        . . .
        task C
        . . .
        Day 2
        . . .

Quick Access

The user could keep a favorite button to the "Timelogs" node. Clicking the button would display the node and all (or at least the first X children. Clicking on the most recent child would open the form and, presto, the user can enter new time data.

In some embodiments, a user may create a special view to see all time spent on a particular project, possibly with subtotals by task, client, project, or the like.

One embodiment provides an end of day review where the user could compare estimated hours with actual hours and hopefully improve organization estimating. Similarly, use prior day's timelog to augment template and produce next day's timelog.

Some embodiments tie notifications into timelog so that other people could be notified when a task is complete.

Dashboard

The dashboard provides the following:
        shows tasks and events for today; not directly editable, must open calendar view
        active projects;
        user can popup list of projects and change what's active
        click a project opens a project view (or graph view of project)
        can assign alerts to tasks and events
        favorite buttons that depend on context—relate to a particular node
        favorite buttons can open various kinds of views, not just graph views
        multiple dashboards for each project, similar to multiple desktop views
        context dependent panels within dashboard—put "stickies" on dashboard Storage and Synchronization Synchronization Mechanics A queue of changes may keep track of every change at the node level. The queue may be triples of node id, action, new value. In some instances, the new value is not relevant. Finer resolution of changes, that is the editing of values, might not be tracked, although some of the controls used have undo buffers that are operational while the control has focus.

Creating a new node: add the tuple [node id, new, null]; this action must be combined with "adding link to a child", below.

Updating the description, or some other property: [node id, property id, value].

Adding a link to a child: [parent id, add-link, child id].

Removing a link to a child: [parent id, rem-link, child id]; if removing the child's last parent link, this must be combined with "deleting a node", below, and the child must not have any children.

Deleting a node: [node id, delete, null]; node must not have any children; must not have any parent or child links.

Propagating Changes

Having the "change queue" allows one to replay the changes on a mirror database. Assume that at some point in time, two databases A and B have exactly the same content and we start with an empty change queue (or mark a place in the queue). Then one may apply some changes to Database A. By sequentially going through the change queue, we can apply the same changes to Database B.

However, in some instances the other database B might change before the updates from A are applied. That also implies changes from B need to be applied to A. The following provides one approach to addressing possible issues:

Creating a new node: cannot overlap; the user could create two identical-looking nodes, but may not consider those identical.

Updating a property: the user can set a preference to always accept A vs. B, or the discrepancy can be shown to the user during the sync and the user can make a selection on the fly.

Adding a link to a child: if either the parent or the child doesn't exist on B that implies that changes that will be applied from B to A will include deletion of that parent or child. Thus whatever link would have been added will be destroyed anyway. This means the user made some changes in one db, went the other and effectively destroyed them. This should be no problem, except we should alert the user.

Removing a link to a child: same as for adding a link.

Deleting a node: Same as for adding a link; if the node doesn't exist, the reciprocal action will occur when updating B to A. No warning needed for this case.

External files: if both have changed; alert the user and let him choose which to preserve.

Connectivity

Various types of connectivity may be supported including: direct (USB, Ethernet), Wi-Fi, mobile (3G, 4G cell networks). Synchronization happens as instantly as possible. If there is a connection, the action commences as soon as it appears in the queue. If the connection is broken, the queue may build and when a connection is reestablished the changes may be propagated as described above.

Synchronization Among Several Devices

With more than two devices to synchronize, one device may be declared a hub. The hub can either be one of the user's machines (a local hub) or be a cloud service.

Using a Local Hub

If the user has several devices, one of them such as a desktop computer at home, can be designated as a hub. All changes may synch with the local hub. For example if the hub is H and there are two other devices A and B, A cannot synch with B. But both A and B can synch with H which ends up indirectly with A and B keeping in synch.

Using a Cloud Service

In this case, a cloud service may include a version of IMA. In embodiments, the cloud service might provide reduces services, such as it will support the synch operations and interface to a cloud-based database. The cloud service might not replace a local copy of the database, so all queries, updates, and so forth, would happen locally. The changes will be queued and propagated to the cloud service as described above. Use of this cloud service includes providing connectivity. If a user machine is designated as the master, the user will have to ensure connectivity from time to time, which will probably be a manual operation (e.g. plug in a USB cable).

Cloud Service with Partial or No Local Database

This variation would allow the user to operate a local device with no database or a partial database. Potentially, all queries, updates, etc., would go through the Internet. This would include an additional database service layer on top for synchronization. For example, to query for all children of node X, the user's device would transmit some higher level call and the actual query would happen in the cloud service, finally returning a set of child nodes to the user's device.

Privacy

When the user is using a cloud service, the user may want some or all data stored in an encrypted form. Any of a variety of mechanisms may be used to provide privacy.

Synchronization with Other Systems

Along with synching IMA nodes, contacts may synch with Outlook, Gmail, or other services.

Utility

Audio Input

This feature enables the use of a smart phone's ability to record audio and store the resulting data as a node containing a reference to an external file. It also enables the use of voice recognition to directly translate audio into text. It may further employ remote audio services to provide instructions to IMA.

Printing

Printing may be based on a selection, so that what is selected is printed. By default, formatting may be based on levels and closely mimic the <h1>, <h2>, etc tags in HTML for nodes that have printed children. More specifically, if any of the siblings have printed children, it will be printed as a heading. For nodes without printed children, the style may mimic the <p>html tag format. However, the user can provide their own styles, based on level. Attributes (e.g., paragraph numbering) can be set on a per-level basis, such as font, line spacing, indent, and the like.

Importing

The following "shorthand" format is may be used to enable importing of information into IMA:

Every node starts with a dash (-); doesn't matter what column.

A top level node has one dash, 2nd level two dashes, and so on.

A nodes parent is the closest preceding node of a higher level.

Text that follows the dash(es) becomes the node's description. No attributes.

If the text spans more than one line, continue on the next line without any preceding dashes.

All blank lines, preceding and trailing spaces discarded.

One non-limiting example is the following:
- level one
-- level two
--- level three
--- another level three with more than one line of text
-- level 2B (parent is "level one")
--- asdf (parent is "level 2B")

Regardless of format, the imported node(s) may be added as children at the location the user specifies. In one embodiment, it is hierarchical—not a digraph. Other formats may be used for import/export, including XML, JSON, BSON, and the like.

Exporting

The nodes exported may be based on a selection. Only actual selected nodes are exported; children that are not expanded might not be exported. The exported nodes may be hierarchical—not representing a digraph.

Archiving

Archiving may be thought of as a graph pruning operation. This means that, given a selected node, that node and every descendent of it may be the archive set. Some embodiments determine whether or when nodes can be reached from outside. If detected, the user makes a choice as to whether such subgraphs (headed by outside-referenced nodes) should be archived or not.

Archived sets can be stored in separate databases. All references to archived nodes are indicated somehow so that the database has referential integrity. An attempt to view an archived node could be handled by opening another instance of IMA using the archive database.

Customization and Appearance

The following provides additional, non-exhaustive approaches for customization and modifying appearance of displays.

User defined color coding.

Assign fonts, font style by level in displayed graph.

Make each type of window have a different look so that they are readily distinguishable.

Need user preferences dialog(s).

Graph view with separate pane for currently selected node; would show things such as the categories the node belongs to, its noncategory parents, . . .

Long list subset size.

Hide system links and nodes; e.g. links to activity-node parent.

Referring to FIG. 16, one non-limiting example is provided that shows how a user-defined form can customize the appearance of an item and some of its children. In this example, the form template 1620 shows that the primary node (the one the form is associated with) is to be displayed first and underneath are any children with a tag T1. Under that is some fixed text "With:" and to the right of that is a list showing all children tagged with T2.

The above specification, examples, and data provide a complete description of the composition, manufacture, and use of the invention. Since many embodiments of the invention can be made without departing from the spirit and scope of the invention, the invention resides in the claims hereinafter appended.

What is claimed as new and desired to be protected by Letters Patent of the United States is:

1. A computing device for managing content, comprising:
a non-transitory memory device configured to store data and computer-executable instructions; and
a processor that is configured to employ the computer-executable instructions to perform actions of an organizer system, including:
displaying a graphical user-interface (GUI) on a display of the computing device;
providing access, through the GUI, to a plurality of information items, wherein at least one information item is of a different type than another information item in the plurality of information items, and wherein at least a type of at least one of the plurality of information items corresponds to a native application;
associating relationships between at least some of the plurality of information items using at least one of a graph structure or a category, wherein each information item within the graph structure is a node within the graph structure, and is further configured to operate as a folder;
when a parent node having at least one child node associated with the information item type that corresponds to the native application is selected for ordering by a user or the computing device, persistently ordering the at least one child node in regard to the parent node within the graph structure, wherein the parent node is enabled to have at least one of heterogeneous or homogenous children, and wherein a change in the GUI for the at least one selected child node is also separately performed with the corresponding native application; and
displaying through the GUI at least a portion of the relationships within the graph structure or the category.

2. The computing device of claim 1, wherein the information items are designated as one of a note type, an event type, a message type, a geo-coordinate type, or a contact type.

3. The computing device of claim 1, wherein associating relationships further comprises at least one parent node information item that is also designated as a child node information item to at least one of the parent node's children nodes.

4. The computing device of claim 1, wherein the relationship between information items includes associating a plurality of item types to a same contact type.

5. The computing device of claim 1, wherein at least two information items within the graph structure are parent nodes having a common child information item within the graph structure.

6. The computing device of claim 5, wherein when the relationships between the common child information item and both of the parent nodes are cut or otherwise deleted and the child has no other relationship with any other parent nodes, providing an alert that the child has no parent relationships within the graph structure.

7. The computing device of claim 5, wherein when one parent node having a relationship to the common child information item is cut or otherwise deleted, requesting what action, if any, to apply to the common child information item, including deleting the common child, or retaining the common child within the directed graph structure.

8. The computing device of claim 1, wherein the processor is configured to employ the computer-executable instruction to perform actions, further including:
creating at least one information item identified as a project information item type;
identifying one or more of the plurality of information items as dependent from the created project information item; and
employing the dependencies between information items to the project information item to display a Gantt view.

9. A computing system, comprising:
a non-transitory memory device; and
an information management application stored on the memory device that when executed by at least one processor, performs actions, including:
displaying a graphical user-interface (GUI) on a display screen;
providing access, through the GUI, to a plurality of information items, wherein at least one information item is of a different type than another information item in the plurality of information items, and wherein at least a type of at least one of the plurality of information items corresponds to a native application;
associating relationships between at least some of the plurality of information items using at least one of a graph structure or a category, wherein each information item within the graph structure is a node within the graph structure, and is further configured to operate as a folder;

when a parent node having at least one child node associated with the information item type that corresponds to the native application is selected for ordering by a user or the computing device, persistently ordering the at least one child node in regard to the parent node within the graph structure, wherein the parent node is enabled to have at least one of heterogeneous or homogenous children, and wherein a change in the GUI for the at least one selected child node is also separately performed with the corresponding native application; and displaying through the GUI at least a portion of the relationships with the graph structure or the category.

10. The computing system of claim 9, wherein at least two information items within the graph structure are parent nodes having a common child information item within the graph structure.

11. The computing system of claim 10, wherein when the relationships between the common child information item and both of the parent nodes are cut or otherwise deleted and the child has no other relationship with any other parent nodes, providing an alert that the child has no parent relationships within the graph structure.

12. The computing system of claim 10, wherein when one parent node having a relationship to the common child information item is cut or otherwise deleted and the child has no other relationship with any other parent node, requesting what action, if any, to apply to the common child information item, including deleting the common child, ox retaining the common child within the directed graph structure.

13. The computing system of claim 9, wherein the relationship between information items includes associating a plurality of item types to a same contact type.

14. The computing system of claim 9, wherein the information items are designated as one of a note type, an event type, a message type, a geo-coordinate type, or a contact type.

15. The computing system of claim 9; wherein the information management application performs actions, further including:

providing a plurality of views for simultaneously displaying one or more information items within the plurality of information items; and changing one of the information items displayed using one of the plurality of views, wherein the change to the information item is viewable in each of the other plurality of views immediately when the change is completed or each of the other plurality of views is displayable.

16. The computing system of claim 9, wherein the information management application performs actions further including customizing the display of at least the portion of the displayed relationships using a template.

17. The computing system of claim 9, wherein the information management application performs actions, further including generating a plurality of forms for a family of information items within the plurality of information items, and employing the plurality of forms to provide different views of the family of information items.

18. A non-transitory computer-readable storage medium having computer-executable instructions stored thereon that when installed on a computing device having a processor performs actions, comprising:

loading an information management application onto the computing device, the information management application when executed by at least one processor, performs actions, including:

providing access, through the GUI, to a plurality of information items, wherein at least one information item is of a different type than another information item in the plurality of information items, and wherein at least a type of at least one of the plurality of information items corresponds to a native application;

associating relationships between at least some of the plurality of information items using at least one of a graph structure or a category, wherein each information item within the graph structure is a node within the graph structure, and is further configured to operate as a folder;

when a parent node having at least one child node associated with the information item type that corresponds to the native application is selected for ordering by a user or the computing device, persistently ordering the at least one child node in regard to the parent node within the graph structure, wherein the parent node is enabled to have at least one of heterogeneous or homogenous children, and wherein a change in the GUI for the at least one selected child node is also separately performed with the corresponding native application; and displaying through the GUI at least a portion of the relationships within the graph structure or the category.

19. The storage medium of claim 18, wherein the information items are designated as one of a note type, an event type, a message type, a geo-coordinate type, or a contact type.

20. The storage medium of claim 18, wherein at least two information items within the graph structure are parent nodes having a common child information item within the graph structure.

21. The storage medium of claim 20, wherein when the relationships between the common child information item and both of the parent nodes are cut or otherwise deleted and the child has no other relationship with any other parent nodes, providing an alert that the child has no parent relationships within the graph structure.

22. The storage medium of claim 20, wherein when one parent node having a relationship to the common child information item is cut or otherwise deleted, requesting what action, if any, to apply to the common child information item, including deleting the common child, or retaining the common child within the directed graph structure.

23. The storage medium of claim 18, wherein a subset of information items are designated within a family of information items and, wherein a plurality of forms for the family are useable to provide different views of the family of information items.

24. The storage medium of claim 18, wherein the information management application performs actions, further including customizing the display of at least the portion of the displayed relationships using a template.

25. A computer based method, the method comprising:

loading onto a processor an information management application from a memory device;

executing on the processor the information management application to perform actions, including:

providing access, through the GUI, to a plurality of information items, wherein at least one information item is of a different type than another information item in the plurality of information items, and wherein at least a type of at least one of the plurality of information items corresponds to a native application;

associating relationships between at least some of the plurality of information items using at least one of a graph structure or a category, wherein each information item within the graph structure is a node within the graph structure, and is further configured to operate as a folder;

when a parent node having at least one child node associated with the information item type that corresponds to the native application is selected for ordering by a user or the computing device, persistently ordering the at least one child node in regard to the parent node within the graph structure, wherein the parent node is enabled to have at least one of heterogeneous or homogenous children, and wherein a change in the GUI for the at least one selected child node is also separately performed with the corresponding native application; and displaying through the GUI at least a portion of the relationships within the graph structure or the category.

26. The computer based method of claim 25, wherein the information management application performs actions, further including customizing the display of at least the portion of the displayed relationships using a template.

27. The computer based method of claim 25, wherein the information items are designated as one of a note type, an event type, a message type, a geo-coordinate type, or a contact type.

28. The computer based method of claim 25, wherein at least two information items within the graph structure are parent nodes having a common child information item within the graph structure.

29. The computer based method of claim 28, wherein when the relationships between the common child information item and both of the parent nodes are cut or otherwise deleted and the child has no other relationship with any other parent nodes, providing an alert that the child has no parent relationships within the graph structure.

30. The computer based method of claim 25, wherein when one parent node having a relationship to the common child information item is cut or otherwise deleted, requesting what action, if any, to apply to the common child information item, including deleting the common child, or retaining the common child within the graph structure.

* * * * *